US012008336B2

(12) United States Patent
Tu et al.

(10) Patent No.: US 12,008,336 B2
(45) Date of Patent: Jun. 11, 2024

(54) MULTIMODAL TRANSLATION METHOD, APPARATUS, ELECTRONIC DEVICE AND COMPUTER-READABLE STORAGE MEDIUM

(71) Applicant: SAMSUNG ELECTRONICS CO., LTD., Suwon-si (KR)

(72) Inventors: Mei Tu, Beijing (CN); Fan Zhang, Beijing (CN); Lijie Wang, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 333 days.

(21) Appl. No.: 17/479,195

(22) Filed: Sep. 20, 2021

(65) Prior Publication Data

US 2022/0092276 A1 Mar. 24, 2022

(30) Foreign Application Priority Data

Sep. 22, 2020 (CN) .......................... 202011003004.7

(51) Int. Cl.
*G06F 40/58* (2020.01)
*G06F 18/25* (2023.01)
(Continued)

(52) U.S. Cl.
CPC .............. *G06F 40/58* (2020.01); *G06F 18/25* (2023.01); *G06F 40/30* (2020.01); *G06F 40/44* (2020.01); *G06N 3/04* (2013.01); *G06V 30/274* (2022.01)

(58) Field of Classification Search
None
See application file for complete search history.

(56) References Cited

U.S. PATENT DOCUMENTS 10,191,903 B2 1/2019 Lewis et al.
10,762,306 B2 9/2020 Carter et al.
(Continued)

FOREIGN PATENT DOCUMENTS

CN 108959274 B 9/2022
JP 2019023690 A * 2/2019
(Continued)

OTHER PUBLICATIONS

Search Report (PCT/ISA/210) dated Dec. 28, 2021 by the International Searching Authority in International Application No. PCT/KR2021/012735.
(Continued)

*Primary Examiner* — Quynh H Nguyen
(74) *Attorney, Agent, or Firm* — Sughrue Mion, PLLC

(57) ABSTRACT

A method for providing multimodal translation of a content in a source language is provided. The method includes receiving a user input with respect to a translation request of text included in the content, in response to receiving the user input, acquiring a multimodal input from the content, the multimodal input including location information related to the content other multimodal inputs, generating scene information representing the multimodal input related to the content by using a fusion layer based on the location information and the other multimodal inputs, identifying a candidate word set in a target language, determining at least one candidate word from the candidate word set based on the scene information, and translating the text included in the content into the target language using a translation model based on the determined at least one candidate word.

20 Claims, 38 Drawing Sheets

(51) Int. Cl.
    *G06F 40/30*     (2020.01)
    *G06F 40/44*     (2020.01)
    *G06N 3/04*     (2023.01)
    *G06V 30/262*     (2022.01)

(56) References Cited

U.S. PATENT DOCUMENTS

2006/0083431 A1     4/2006   Bliss
2018/0336176 A1*  11/2018  Lee .................... G06F 40/216
2020/0193160 A1     6/2020   Lee et al.
2020/0226328 A1     7/2020   Tu et al.

FOREIGN PATENT DOCUMENTS

KR     10-2014-0049922 A     4/2014
KR     10-2020-0023013 A     3/2020
KR     10-2020-0073967 A     6/2020

OTHER PUBLICATIONS

Written Opinion (PCT/ISA/237) dated Dec. 28, 2021 by the International Searching Authority in International Application No. PCT/KR2021/012735.

\* cited by examiner

FIG. 3

MULTIMODAL TRANSLATION METHOD, APPARATUS, ELECTRONIC DEVICE AND COMPUTER-READABLE STORAGE MEDIUM

CROSS-REFERENCE TO RELATED APPLICATION(S)

This application is based on and claims priority under 35 U.S.C. § 119 to Chinese Patent Applications No. 202011003004.7 filed on Sep. 22, 2020, in the Chinese Patent Office, the disclosure of which is incorporated by reference herein in its entirety.

BACKGROUND

1. Field

The disclosure relates to natural language processing and, in particular, to a multimodal translation method, apparatus, electronic device, and computer-readable storage medium.

2. Description of Related Art

Natural language processing is a technology for realizing effective communication between humans and computers in natural language. Neural machine translation is a machine translation method proposed in recent years that uses neural networks to achieve translation between different languages.

Multimodal translation may refer to the use of multiple senses such as hearing, vision, and touch to communicate through languages, images, audio, actions and other means and symbol resources, to integrate language and other relevant meaning resources. Optimization of the multimodal translation methods is desired.

SUMMARY

Provided is a multimodal translation method, apparatus, electronic device, and computer-readable storage medium.

Additional aspects will be set forth in part in the description which follows and, in part, will be apparent from the description, or may be learned by practice of the presented embodiments.

In accordance with an aspect of the disclosure, a method for providing multimodal translation of a content in a source language may include receiving a user input with respect to a translation request of text included in the content, in response to receiving the user input, acquiring a multimodal input from the content, the multimodal input including location information related to the content and other multimodal inputs, generating scene information representing the multimodal input related to the content by using a fusion layer based on the location information and other multimodal inputs, identifying a candidate word set in a target language, determining at least one candidate word from the candidate word set based on the scene information, and translating the text included in the content into the target language using a translation model based on the determined at least one candidate word.

In accordance with an aspect of the disclosure, an electronic device for multimodal translation of a content in a source language may include at least one processor, and a memory configured to store instructions that, when executed, may cause the at least one processor to receive a user input with respect to a translation request of text included in the content, in response to receiving the user input, acquire a multimodal input from a content, the multimodal input including location information related to the content and other multimodal inputs, generate scene information representing the multimodal input related to the content by using a fusion layer based on the location information and the other multimodal inputs, identify a candidate word set in a target language, determine at least one candidate word from the candidate word set based on the scene information, and translate the text included in the content into the target language using a translation model based on the determined at least one candidate word.

In accordance with an aspect of the disclosure, a non-transitory computer-readable storage medium may store instructions that, when executed by a processor, cause the processor to receive a user input with respect to a translation request of text included in the content, in response to receiving the user input, acquire a multimodal input from a content, the multimodal input including location information related to the content other multimodal inputs, generate scene information representing the multimodal input related to the content by using a fusion layer based on the location information and the other multimodal inputs, identify a candidate word set in a target language, determine at least one candidate word from the candidate word set based on the scene information, and translate the text included in the content into the target language using a translation model based on the determined at least one candidate word.

In an alternative embodiment of the disclosure, wherein the determining scene information according to the multimodal input comprises: extracting location entity semantic information based on the location information, and extracting source text semantic information and multimodal feature based on other multimodal inputs; and acquiring the scene information based on the location entity semantic information, the source text semantic information, and the multimodal feature.

In an alternative embodiment of the disclosure, the multimodal feature comprises at least one of the following: edge information of an image, color information of an image, abstractive information of an image, pitch information, vocal information, and phonetic information.

In an alternative embodiment of the disclosure, the acquiring translated content in a target language using a translation model, based on the scene information comprises: determining a running layer in the translation model based on the scene information; acquiring the translated content using the translation model consisting of the running layer.

In an alternative embodiment of the disclosure, the determining the running layer in the translation model based on the scene information comprises: determining a domain label based on the scene information; selecting a layer masker corresponding to the domain label from pre-defined layer maskers; and determining the running layer in the translation model based on the selected layer masker.

In an alternative embodiment of the disclosure, the determining a domain label based on the scene information, comprises: performing feature extraction on the scene information using a convolutional neural network (CNN); and determining the domain label using a context classification network based on output of the CNN.

In an alternative embodiment of the disclosure, the acquiring translated content in a target language using a translation model, based on the scene information comprises: determining candidate words according to the scene information; and determining the translated content from the candidate words according to output of the translation model.

In an alternative embodiment of the disclosure, the determining the candidate words according to the scene information, comprises: fusing the source text semantic information extracted from the multimodal input with the scene information to acquire a third fusion feature; performing feature extraction on the third fusion feature using a feedforward neural network; calculating a selection probability of each word in a set of the candidate words in the target language according to output of the feedforward neural network; and determining the candidate words according to the selection probability of each word in the target language.

In an alternative embodiment of the disclosure, a multimodal translation apparatus is provided, and the apparatus includes: a first acquisition module, configured to acquire a multimodal input in a source language; a determining module, configured to determine scene information according to the multimodal input; and a second acquisition module, configured to acquire translated content in a target language using a translation model, based on the scene information.

BRIEF DESCRIPTION OF THE DRAWINGS

The above and other aspects, features, and advantages of certain embodiments of the present disclosure will be more apparent from the following description taken in conjunction with the accompanying drawings, in which.

FIG. 3 illustrates a diagram of translation errors caused by a multimodal translation method in an example;

DETAILED DESCRIPTION

Figure 1:
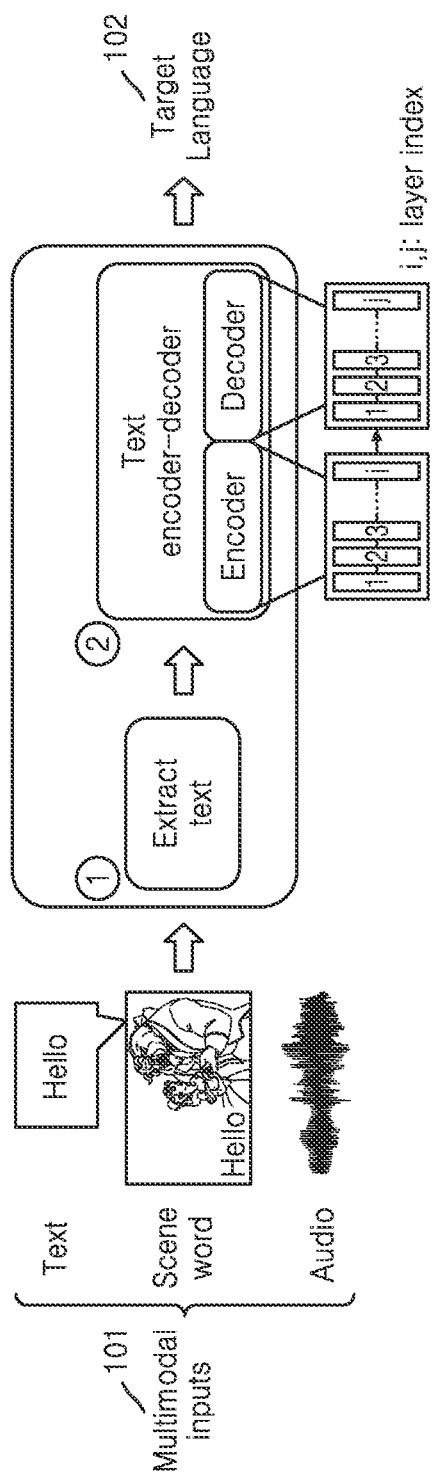
FIG. 1 illustrates a diagram of a process of a multimodal translation method.

Embodiments of the present disclosure may be described in detail hereafter. The examples of these embodiments have been illustrated in the drawings throughout which same or similar reference numerals refer to same or similar elements or elements having same or similar functions. The embodiments described hereafter with reference to the drawings are illustrative, merely used for explaining the present disclosure and should not be regarded as any limitations thereto.

It should be understood by those skill in the art that singular forms "a", "an", "the", and "said" may be intended to include plural forms as well, unless otherwise stated. It should be further understood that terms "include/including" used in this specification specify the presence of the stated features, integers, steps, operations, elements and/or components, but not exclusive of the presence or addition of one or more other features, integers, steps, operations, elements, components, and/or combinations thereof. It should be understood that when a component is referred to as being "connected to" or "coupled to" another component, it may be directly connected or coupled to other elements or provided with intervening elements therebetween. In addition, "connected to" or "coupled to" as used herein may include wireless connection or coupling. As used herein, term "and/or" includes all or any of one or more associated listed items or combinations thereof.

In order to better understand the solutions provided by the embodiments of the disclosure, the following first briefly describes related technologies involved in the disclosure.

FIG. 1 illustrates a diagram of a process of a multimodal translation method. An example multimodal input is shown in FIG. 1, including the following two operations: (1) extracting text from multimodal input 101 (including at least one of text, image, video, and audio), such as recognizing character from scene image (i.e., scene character recognition (SCR)), or recognizing transliteration text from audio (such as speech) (i.e., acoustic speech recognition (ASR)), and (2) translating the text acquired in into the target language 102 through the encoder-decoder.

One problem of multimodal translation is that the scene information is lost after extracting the text in (1) (referred to as an ambiguous problem).

Figure 2:
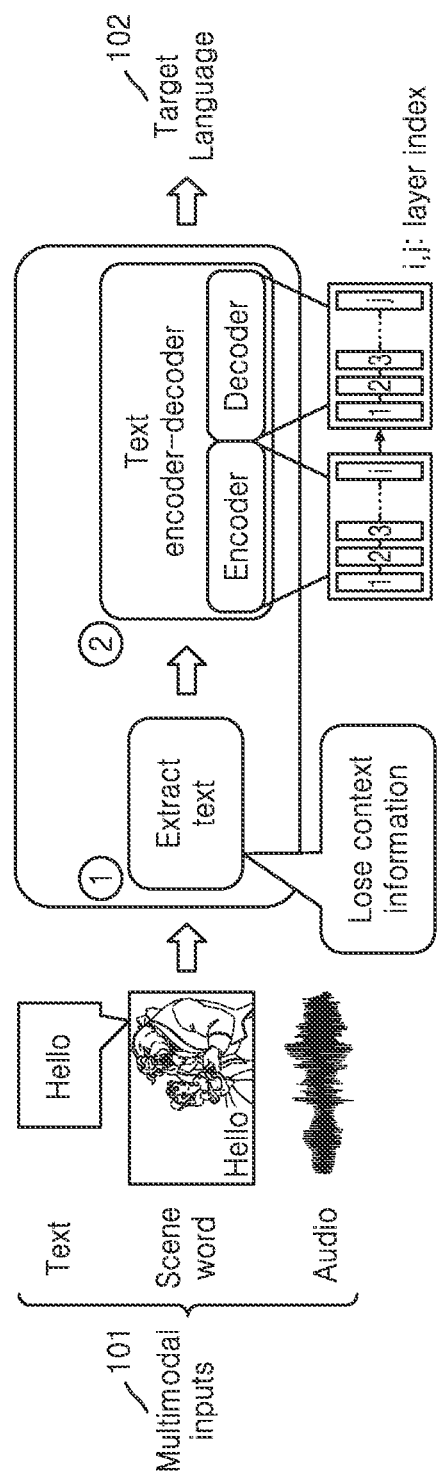
FIG. 2 illustrates a diagram of a process of a multimodal translation method.

FIG. 2 illustrates a diagram of a process of a multimodal translation method. As shown in FIG. 2, the context information (e.g., scene information such as restaurant, market, hotel, etc.) would be lost (i.e., upon extracting the text on menu, the restaurant scene information would be lost), which may cause ambiguity in understanding.

Figure 3:
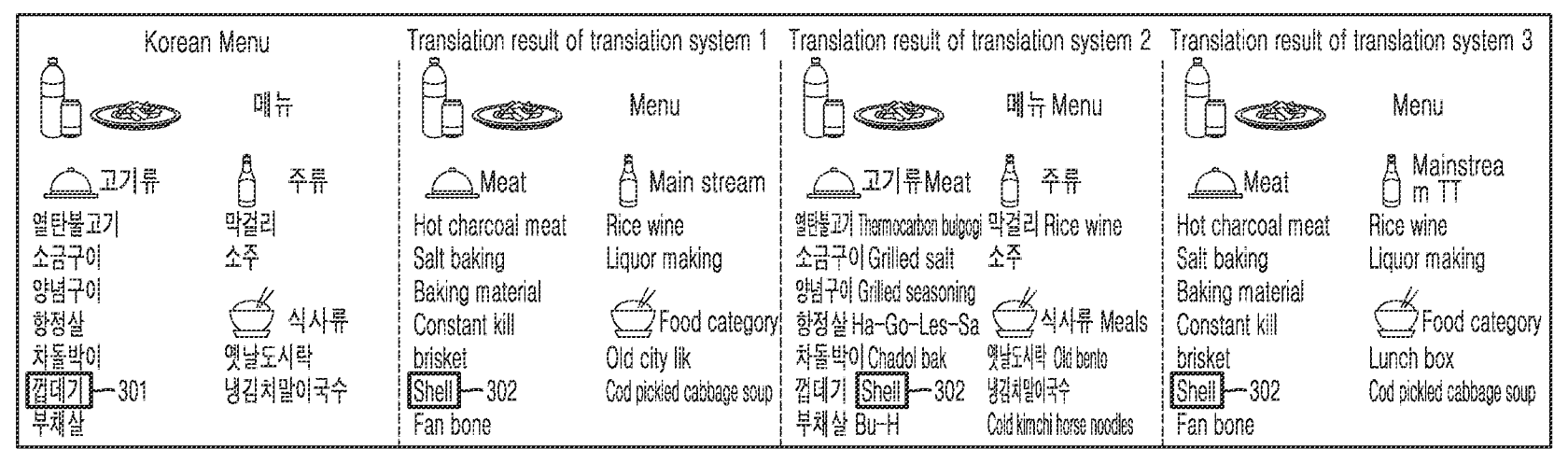

FIG. 3 illustrates a diagram of translation errors caused by a multimodal translation method in an example. As shown in FIG. 3, when the characters in the menu image are recognized, the translator translates the recognized characters "껍데기" 301 into "Shell" 302, but "껍데기" 301 is a polysemous word. In the restaurant, "껍데기" 301 should be translated into "pork rinds".

Another problem is memory consumption. In order to import scene information, one translation method includes labeling each scene with a domain label and training a translation model for each domain. Assuming that the translation model of each domain is 140 MB, then 1.4 GB of memory may be required to train the model of 10 domains. This may bring a lot of memory consumption.

Another problem is long translation latency. Multimodal inputs are subjected to pipeline translation processes such as text extraction, encoding, decoding, etc. If it is used on the side of the device whose computing power itself is not as good as the cloud, it may cause the problem of slow translation speed. Multimodal inputs in a source language may include location information obtained from an electronic device and other multimodal inputs.

As disclosed herein, a multimodal feature fusing method based on location attention is provided.

The disclosure provides a multimodal feature fusing method based on location attention, where, the method uses location information to assign weights to multimodal inputs and extract scene features that are discriminative to domain labels (also referred to as scene information or domain related scene information in the disclosure), more accurately predicting domain labels, thereby affecting the translation results.

The disclosure provides a neural network layer selection method based on domain labels.

The domain label-based network selection method disclosed herein selects different layers of an encoder and a decoder for decoding in different domains. Multiple domains share some layer parameters, reducing memory consumption.

The disclosure provides a method for pruning candidate vocabularies based on scene features.

The disclosure provides a method for pruning vocabulary based on scene features, and the method selects target-end candidate vocabularies based on scene features, which reduces search space on a large scale and improves translation speed.

The technical solutions of the disclosure and how the technical solutions of the disclosure solve the above technical problems are described in detail below with specific embodiments. The following specific embodiments may be combined with each other, and the same or similar concepts or processes may not be repeated in some embodiments. The embodiments of the disclosure may be described below in conjunction with the drawings.

Figure 4A:
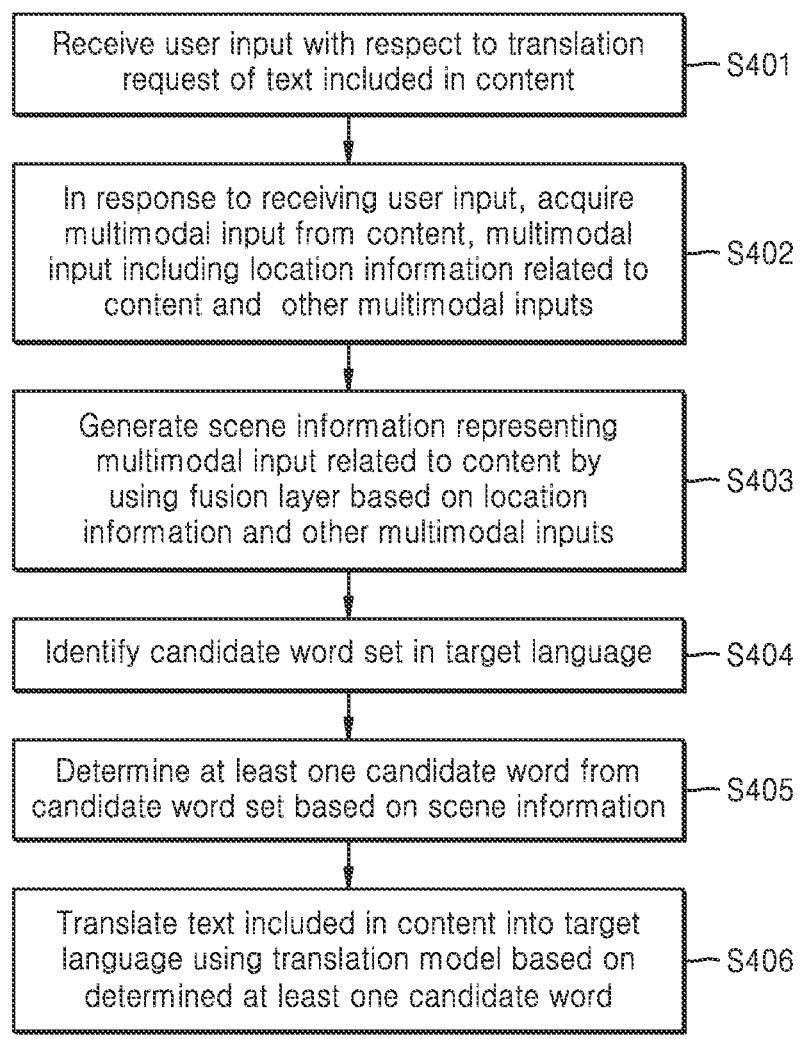
FIG. 4A illustrates a flowchart of a multimodal translation method according to an embodiment.

FIG. 4A illustrates a flowchart of a multimodal translation method according to an embodiment. The method may be applied to a multimodal translation system. The multimodal translation system may be set in a server or in a terminal. As shown in FIG. 4A, the method may include the following operations:

In operation S401, the system may receive a user input with respect to a translation request of text included in the content.

When a user takes a picture of a menu board using a mobile phone terminal, a user interface (UI) related to translation may be formed. If user click the Request Translation button in the UI, it can be recognized as user input.

In operation S402, in response to receiving the user input, the system may acquire a multimodal input from the content, the multimodal input including location information related to the content and other multimodal inputs.

In response to the user input, the electronic device may acquire multimodal input from the content. The multimodal input may include location information obtained from the electronic device and other multimodal inputs. The location information may be related to the content. The other multimodal inputs may include text and at least one of image, audio, video, and biometric signal. For example, in the case of taking a picture of a menu board through a mobile phone terminal and translating the picture, the location where the picture was taken may be location information. Food pictures on the menu may be an example of the other multimodal inputs.

In operation S403, the system may generate scene information representing the multimodal input related to the content by using a fusion layer based on the location information and the other multimodal inputs.

In one embodiment of the present disclosure, the generating of the scene information representing the multimodal input related to the content may include extracting location entity semantic information based on the location information, extracting source text semantic information and a multimodal feature based on the other multimodal inputs; and fusing the location entity semantic information, the source text semantic information, and the multimodal feature to acquire the scene information based on an attention network.

In one embodiment of the present disclosure, the fusing of the location entity semantic information, the source text semantic information, and the multimodal feature to acquire the scene information may include fusing the source text semantic information with the multimodal feature to acquire a first fusion feature, determining a weight of the first fusion feature using the attention network based on the location entity semantic information, weighting the first fusion feature according to the weight, and fusing the weighted first fusion feature with the location entity semantic information to acquire the scene information.

In one embodiment of the present disclosure, the fusing of the location entity semantic information, the source text semantic information, and the multimodal feature to acquire the scene information may include fusing the location entity semantic information with the multimodal feature to acquire a second fusion feature; determining the weight of the source text semantic information using the attention network based on the second fusion feature; and using the weighted source text semantic information as the scene information.

In operation S404, the system may identify a candidate word set in a target language.

Before translating the text included in the content into the target language, the electronic device may identify a candidate word set in target language.

In operation S405, the system may determine at least one candidate word from the candidate word set based on the scene information.

In one embodiment of the present disclosure, the determining of the at least one candidate word may include calculating selection probabilities of a plurality of words in the candidate word set in the target language based on the scene information, and determining the at least one candidate word based on the selection probabilities of the plurality of words in the candidate word set in the target language.

In one embodiment of the present disclosure, the translating of the text included in the content into the target language may include calculating target vocabulary probabilities of the at least one candidate word based on a softmax layer, and translating the text included in the content into the target language using the translation model based on the target vocabulary probabilities of the at least one candidate word.

In operation S406, the system may translate the text included in the content into the target language using a translation model based on the determined at least one candidate word.

In one embodiment of the present disclosure, the translating of the text included in the content into the target language may include calculating selection probabilities of a plurality of words in the candidate word set in the target language based on the scene information, determining the least one of candidate word based on the selection probabilities of the plurality of words in the candidate word set in the target language, calculating target vocabulary probabilities of the at least one candidate word based on a softmax layer, and translating the text included in the content into the target language using the translation model based on the target vocabulary probabilities of the at least one candidate word.

Figure 4B:
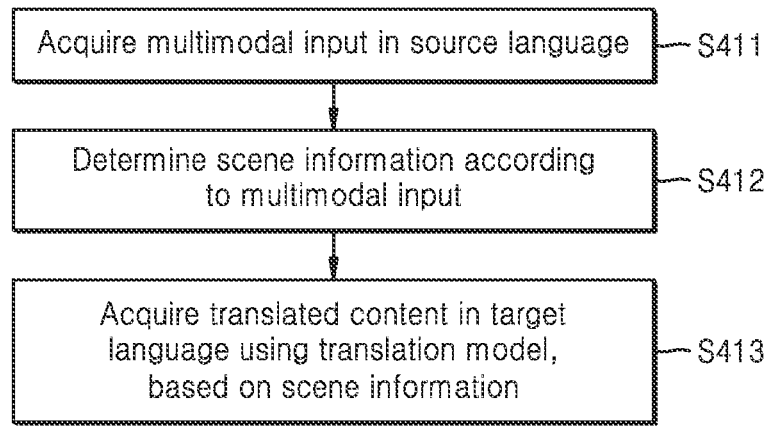
FIG. 4B illustrates a flowchart of a multimodal translation method according to an embodiment.

FIG. 4B illustrates a flowchart of a multimodal translation method according to an embodiment. The method may be applied to a multimodal translation system. The multimodal translation system may be set in a server or in a terminal. As shown in FIG. 4B, the method may include the following operations:

In operation S411, the system may acquire a multimodal input in a source language.

The multimodal input 101 includes location information and at least one of the following: text, image, audio, video, or biometric signal. The location information may be location information where the source language is derived. For example, if the source language is derived from an image of a restaurant, the location information may be the location of the restaurant.

Specifically, after the server or terminal for implementing the multimodal translation method receives at least one of text, image, audio, and video, if the text is received, the source language text to be translated is directly extracted from the text. If the image is received, the source language text in the image is extracted through scene text recognition. If the audio or video is received, the text is extracted through voice recognition as the source language text to be translated.

In operation S412, the system may determine scene information according to the multimodal input, In the disclosure, the scene information may also be referred to as a domain related scene information.

The domain related scene information may be domains related to multimodal input 101.

Specifically, after a system receives inputs such as image, audio, or video, it may extract image features, audio and video voice features as multimodal features using existing technologies. The specific process of determining domain related scene information may be described in detail below.

In operation S413, the system may acquire translated content in a target language using a translation model, based on the scene information.

Specifically, based on the domain related scene information, the running layer may be determined from the translation model, and the translated content may be acquired according to the running layer of the translation model, based on the domain related scene information, multiple candidate words are determined, and then according to the output of the translation model, the translated content is determined from the candidate words, and the process of determining the translated content in the target language 102 may be described in detail below.

In the above embodiment, importing the domain related scene information into the translation, may contribute to the translation model better judging the current scene, thereby reducing ambiguity in semantic understanding and improving the accuracy of translation.

The specific determination process of the domain related scene information may be further described below in conjunction with the drawings and embodiments.

Figure 5:
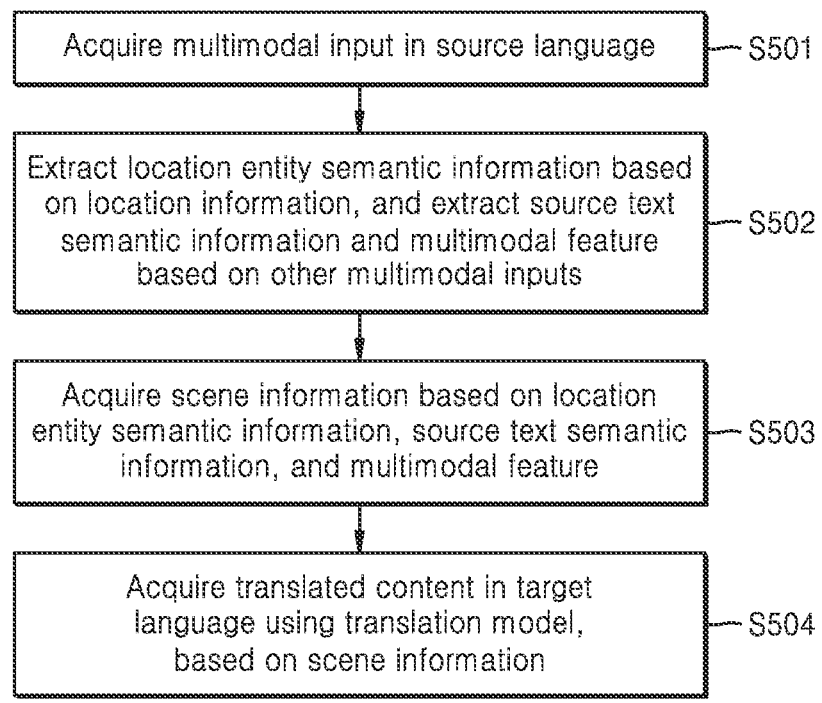
FIG. 5 illustrates a flowchart of a multimodal translation method according to an embodiment.

FIG. 5 illustrates a flowchart of a multimodal translation method according to an embodiment. A possible implementation manner of the embodiment, as shown in FIG. 5, shows a schematic flow chart of a multimodal translation method provided by an embodiment of the disclosure.

In operation S501, the system may acquire multimodal input in a source language.

In one embodiment of the present disclosure, acquiring multimodal input in a source language may include receiving a user input with respect to the translation request of text included in the content, in response to the user input, acquiring a multimodal input from the content, the multimodal input including location information related to the content and other multimodal inputs.

In operation S502, the system may extract the location entity semantic information based on the location information, and may extract the source text semantic information and multimodal features based on other multimodal inputs.

The location entity semantic information may comprise a feature vector or a location feature associated with the location information. Specifically, extracting the location entity semantic information according to the location information in operation S502 may include: (1) extracting location keywords from location information, (2) determining related words associated with the location keywords, (3) querying the word embedding corresponding to the related word to acquire the location entity semantic information.

Specifically, after receiving the input of location information, the system extracts location-related words or phrases through location keywords. The system presets a lookup word embedding table, and the lookup word embedding table is set with multiple related words. Each related word is set with a corresponding word embedding, and the word embedding corresponding to the related word is queried to acquire the location entity semantic information.

In the disclosure, the location entity semantic information may also be referred to as a location feature.

For example, part-of-speech labeling is performed for texts that provide location information, and nouns/noun phrases/location prepositions are extracted as location-related words or phrases. For example, the system acquires the location information text: "KFC (Taiyanggong Restaurant), Capital Mall F1, No. 12, Taiyanggong Middle Road, Chaoyang District, Beijing", gets "KFC/noun (/punctuation Taiyanggong/noun Restaurant/noun)/punctuation, /punctuation Beijing/noun/punctuation Chaoyang District/noun/punctuation Taiyanggong/noun Middle Road/noun No. 12/numeral Capital/noun Mall/noun F1/numeral" after part-of-speech labeling, finally acquires the location-related words or phrases: "KFC Taiyanggong Restaurant, Capital Mall, Taiyanggong Middle Road, Chaoyang District, Beijing". If the location information is not acquired, the location feature is set as a preset vector, for example, each element is set as a vector of 1e-06 with a size of 1×H, where H is the same as a second dimension of the source language word embedding.

In some embodiments, the other multimodal inputs 101 include text, and also include at least one of image, audio, video, and biometric signal, in in operation S502, the source text semantic information and multimodal features are extracted based on other multimodal inputs, including: (1) extracting the source language text to be translated from other multimodal inputs, (2) converting the extracted source language text into the source text semantic information, (3) extracting multimodal features from at least one of text, image, audio, video, and biometric signal.

Specifically, after receiving multimodal input, such as text, image, audio, video and other signals, the system may directly extract the source language text to be translated from the text, or extract the source language text in the image through scene text recognition, or extract the text as the source language text to be translated through speech recognition. The system presets a lookup word embedding table, which sets multiple words corresponding to the source language text, and each word is set with a corresponding word embedding, which is mapped to the source text semantic information through the lookup word embedding table.

In the disclosure, the source text semantic information may also be referred to as the source language word embedding, source word embedding or the source language word embedding feature. The source text semantic information may comprise a word embedding of the source language extracted from the other multimodal inputs.

Specifically, after receiving image/audio/video inputs, the system extracts image features or voice features as multimodal features, if image and audio are input at the same time, the image features and voice features are extracted separately and then fused into multimodal features. The fusing method is: the image features and the voice features are performed by a linear transformation, respectively, and then normalized, and finally concatenated together.

In operation S503: acquiring scene information based on the location entity semantic information, the source text semantic information, and the multimodal feature. Specifically, the acquiring of scene information based on the location entity semantic information, the source text semantic information, and the multimodal feature in in operation S503 may include:

Based on the attention network, the location entity semantic information, the source text semantic information, and the multimodal feature are fused to acquire the fusion result, and the scene information is acquired based on the fusion result. The multimodal feature may comprise at least one of image feature vector, audio feature vector, video feature vector and biometric signal vector.

The fusion may include fusing features, that is, concatenating two matrices or vectors, or weighted addition of two matrices or vectors. Also, the multimodal feature includes at least one of the following: edge information of the image, color information of the image, abstractive information of the image, pitch information, vocal information, and phonetic information. The pitch information, vocal information, and phonetic information may be pitch information, vocal information, and phonetic information in the voice frequency-domain.

Specifically, the following Equation may be used for fusion:

$$F(T,I,L)=[Att(L,[T,I]), L]=[\text{softmax}([W_QL,W_K[T,I]])W_V[T,I],L] \quad (1)$$

Where, L represents a location feature, T represents a source word embedding in source language, I represents a multimodal feature, Att represents an attention scheme, and each of $W_Q$, $W_K$, $W_V$ may be a learned weight. By multiplying $W_V[T,I]$ with softmax($[W_QL,W_K[T, I]]$) to get the attention result Att(L,[T,I]) and concatenating the attention result with the location feature L, the fusion result F(T,I,L) may be acquired.

In one embodiment, in operation S502, the acquiring of scene information based on the location entity semantic information, the source text semantic information, and the multimodal feature may include fusing the location entity semantic information, the source text semantic information, and the multimodal feature based on the attention network to acquire the domain related scene information. Fusing of the location entity semantic information, the source text semantic information, and the multimodal feature based on the attention network to acquire the domain related scene information may include: (1) fusing the source text semantic information with multimodal features to acquire a first fusion feature, (2) determining a weight of the first fusion feature using the attention network, based on the location entity semantic information, (3) weighting the first fusion feature according to the weight, (4) fusing the weighted first fusion feature with the location entity semantic information to acquire the domain related scene information. The following may be further explained with examples.

In operation S504, the system may acquire translated content in a target language using a translation model, based on the scene information.

In one embodiment of the present disclosure, specifically, based on the domain related scene information, the running layer may be determined from the translation model, and the translated content may be acquired according to the running layer of the translation model, based on the domain related scene information, multiple candidate words are determined, and then according to the output of the translation model, the translated content is determined from the candidate words, and the process of determining the translated content in the target language 102 may be described in detail below.

In the above embodiment, importing the domain related scene information into the translation, may contribute to the translation model better judging the current scene, thereby reducing ambiguity in semantic understanding and improving the accuracy of translation.

Figure 6:
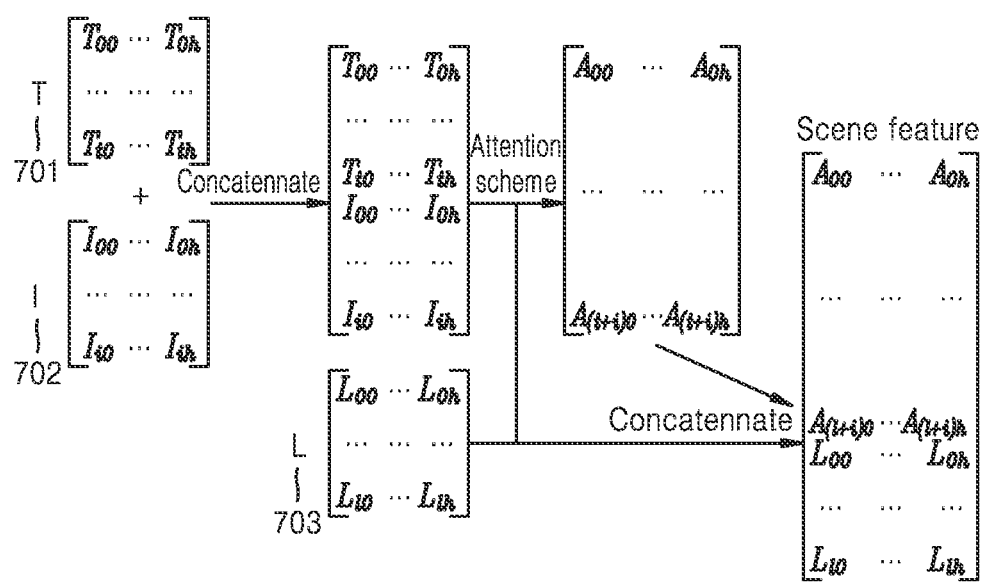
FIG. 6 illustrates a diagram of a process for acquiring scene features according to an embodiment.

FIG. 6 illustrates a diagram of a process for acquiring scene features according to an embodiment.

As shown in FIG. 6, the process of fusion to acquire the domain related scene information may include fusing the source text semantic information 701 and multimodal features 702 to acquire the first fusion feature, performing attention weighting, using the location entity semantic information 703, on the first fusion feature, and: generating the domain related scene information based on the first fusion feature and the weighted feature.

In the disclosure, the domain related scene information may also be referred to as scene information or scene feature.

Figure 7:
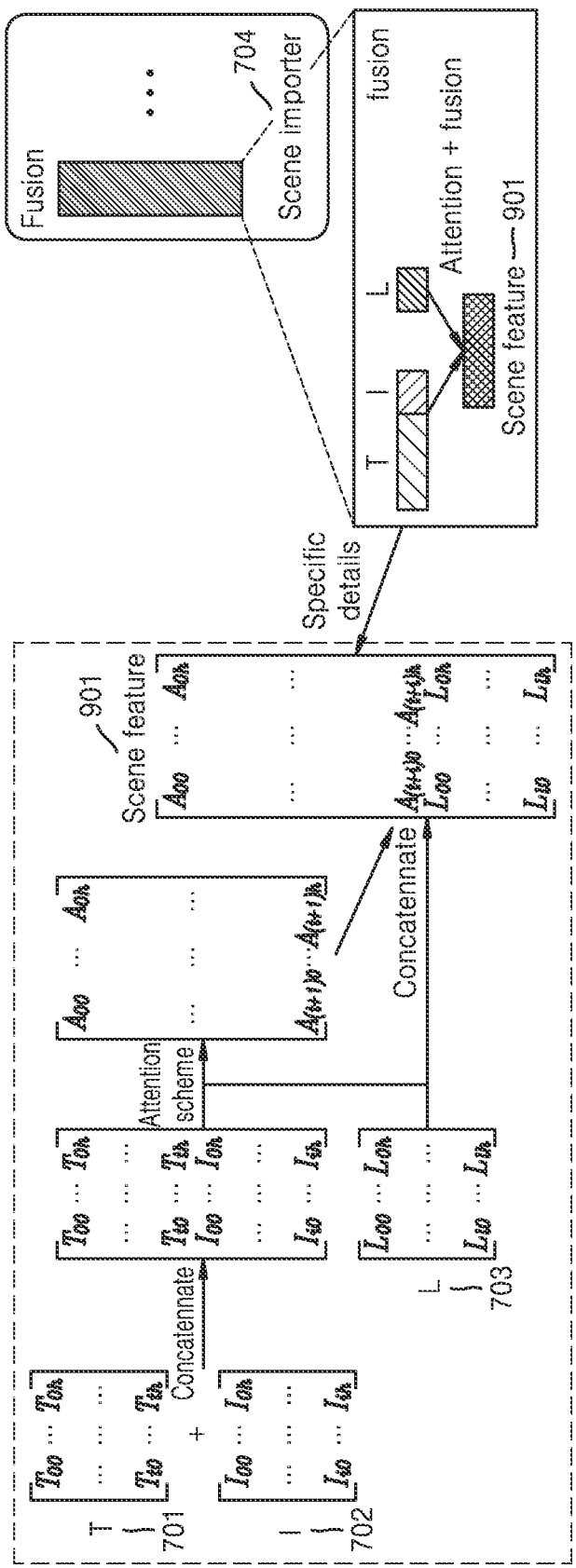
FIG. 7 illustrates a diagram of a process for acquiring scene features according to an embodiment.

FIG. 7 illustrates a diagram of a process for acquiring scene features according to an embodiment. As shown in FIG. 7, a fusion layer is used to fuse a source language word embedding T 701, a multimodal feature I 702 and a location feature L 703 together. The fusion layer is a part in a scene importer 704 and may contribute the scene importer 704 determining a layer masker, and provide the scene information to the context-aware encoder-decoder to deal with ambiguity. The location feature L 703 may help confirm which content in the input information is important for generating domain labels. Based on the location feature L 703, the fused source language word embedding T 701 and the multimodal feature I 702 are weighted by attention, and then the weighted features are fused based on the location feature L 703, to enhance the weighted features.

In addition, if the location feature L 703 is lost in some cases (for example, the user's unauthorized application acquires location information), the fusion layer may fuse the source language word embedding T 701 and the multimodal feature I 702, and then fuse with the location feature L 703 through feedforward networks (FFN) layer, instead of based on attention weighting. This scheme may protect user privacy in some aspects. The fusion layer may extracting, using the location feature L, more useful information from the source language word embedding T 701 and the multimodal feature I 702.

In the above embodiments, when translating the source language text, it may focus on the role of location information, and the translated content in the target language is determined more accurately based on the location information. In other embodiments, it may focus on reinforcement of objective knowledge to subjective knowledge. Image, audio, locations, etc. are all knowledge of the objective world, while text is symbol in human language and belongs to knowledge in a subjective sense.

In another embodiment, the order of feature fusion may be changed. The fusing of location entity semantic information, the source text semantic information, and the multimodal feature based on the attention network to acquire the scene information, may include: (1) fusing the location entity semantic information with the multimodal feature to acquire the second fusion feature, (2) determining the weight of the source text semantic information using the attention network, based on the second fusion feature, and (3) using the weighted source text semantic information as the domain related scene information.

Figure 8:
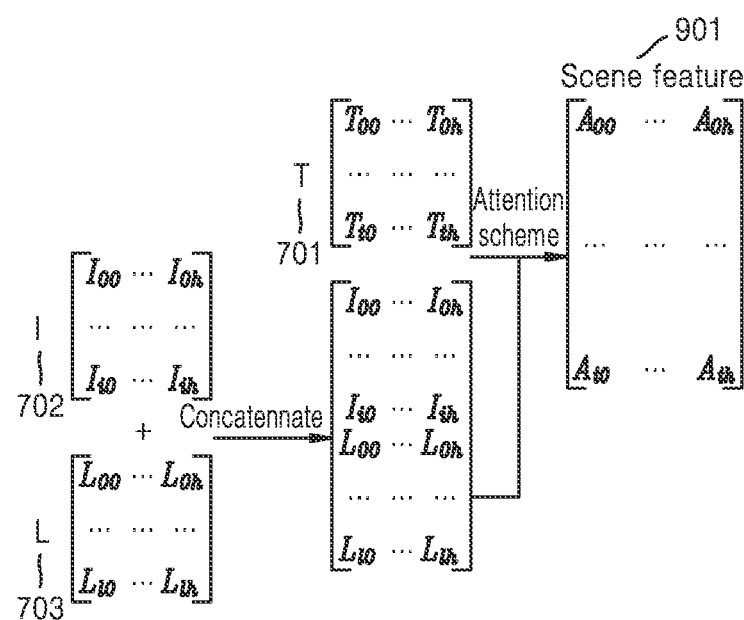
FIG. 8 illustrates a diagram of a process for acquiring scene features according to an embodiment.

FIG. 8 illustrates a diagram of a process for acquiring scene features according to an embodiment.

As shown in FIG. 8, the process of fusion to acquire the domain related scene information may include, fusing the multimodal feature 702 with the location entity semantic information 703 to acquire a second fusion feature, performing attention weighting, using the second fusion feature, on the source text semantic information 701, and using the weighted feature as the domain related scene information.

Figure 9:
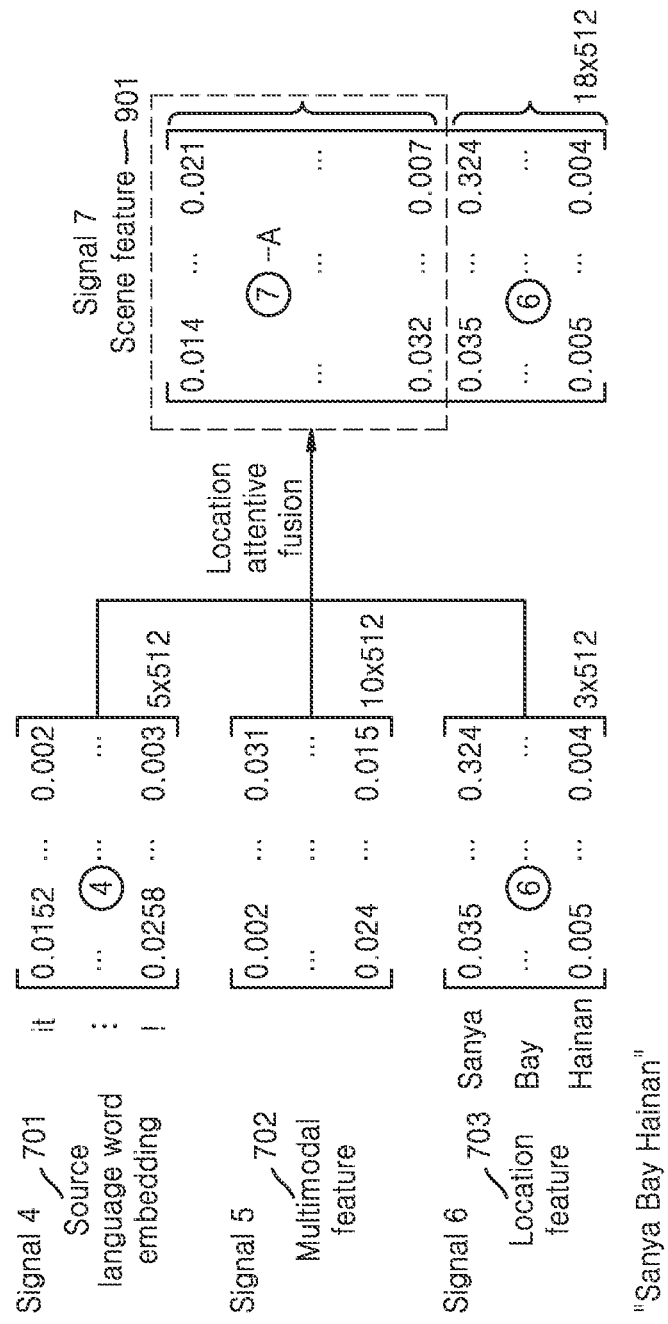
FIG. 9 illustrates a diagram of a process for acquiring scene features according to an embodiment.

FIG. 9 illustrates a diagram of a process for acquiring scene features according to an embodiment. The specific process of acquiring the domain related scene information may be further explained below in conjunction with specific examples in FIG. 9. The system receives the text "it is a good day!" and captures the scene image and location information, and acquires the multimodal features, the location entity semantic information, and the source text semantic information based on the image and location information, the source text semantic information, that is, the source language word embedding 701 is shown in the signal ④, the size of the source language word embedding 701 is [5×512], the multimodal feature 702 is shown in the signal ⑤, and the size of the multimodal feature 702 is [10×512], the location entity semantic information, that is, the location feature 703 is shown in the signal ⑥, and the size of the location feature 703 is [3×512].

The system may perform attention weighting on the location entity semantic information, on the source text semantic information and multimodal features (location-based attention fusion as shown in the figure) to generate signal ⑦-A.

The system may fuse the signal ⑦-A with the location entity semantic information to generate the domain related scene information (that is, the location-based attention fusion shown in the figure), that is, scene feature 901. In FIG. 9, the source text semantic information, the location entity semantic information and the multimodal feature are concatenated to acquire the scene feature 901. The size of the scene feature 901 is [18×512].

The foregoing embodiments describe the process of acquiring the domain related scene information (also referred to as 901). The process of acquiring translated content in the target language based on the domain related scene information may be further described below with reference to the accompanying drawings and embodiments.

Figure 10:
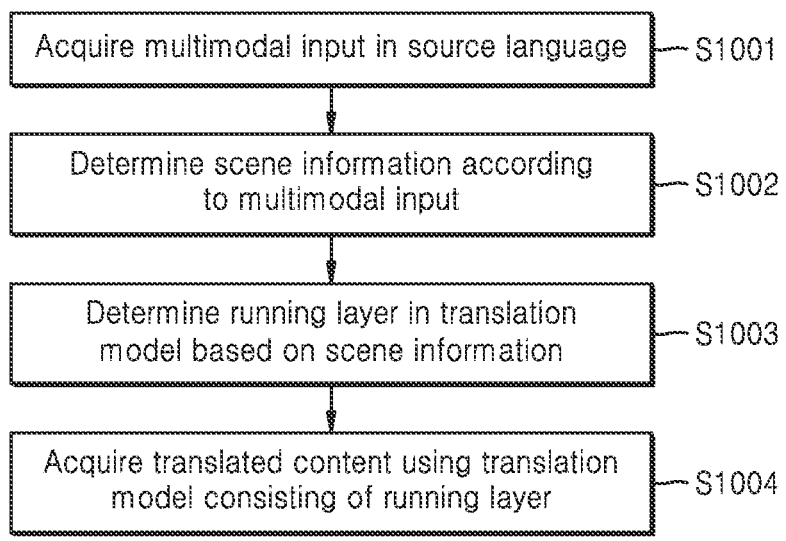
FIG. 10 illustrates a flowchart of a multimodal translation method according to an embodiment.

FIG. 10 illustrates a flowchart of a multimodal translation method according to an embodiment.

In operation S1001, the system may acquire a multimodal input in a source language.

In one embodiment of the present disclosure, the multimodal input may include location information and at least one of the following: text, image, audio, video, and biometric signal. The location information may be location information where the source language is derived. For example, if the source language is derived from an image of a restaurant, the location information may be the location of the restaurant.

In one embodiment of the present disclosure, after the server or terminal for implementing the multimodal translation method receives at least one of text, image, audio, and video, if the text is received, the source language text to be translated is directly extracted from the text, if the image is received, the source language text in the image is extracted through scene text recognition, if the audio or video is received, the text is extracted through voice recognition as the source language text to be translated.

In operation S1002, the system may determine scene information according to the multimodal input.

In the disclosure, the scene information may also be referred to as a domain related scene information.

The domain related scene information may be domains related to multimodal input 101.

Specifically, after a system receives inputs such as image, audio, or video, it may extract image features, audio and video voice features as multimodal features using existing technologies.

In operation S1003, the system may determine the running layer (also referred to as, the at least one of running layers) in the translation model based on the domain related scene information.

The translation model may include multiple encoder layers of the encoder and multiple decoder layers of the decoder, and the running layer of the encoder and the running layer of the decoder may be determined, respectively. Specifically, the determining of the running layer in the translation model based on the domain related scene information in operation S1003 may include the following:

(1) Determining the domain label based on the domain related scene information. The domain label may be a word label corresponding to the domain related scene information, for example, it may include domain labels such as restaurant, hospital, factory, park, etc. Specifically, the determining of the domain label based on domain related scene information may include: performing feature extraction, using a convolutional neural network (CNN), on the domain related scene information, determining, using a context classification network, the domain label based on the output of the CNN.

(2) Selecting a layer masker corresponding to the domain label from the pre-defined layer maskers.

In some embodiments, a plurality of correspondences between different domain labels and layer maskers may be preset, and when the domain labels are determined, the layer masker corresponding to the determined domain labels is queried.

In some other embodiments, the label-mask correspondence may also be automatically learned through the structure search method, which specifically may include: randomly sampling a label-mask correspondence from all the selectable correspondences, for example, sampling "{restaurant:1-4-5-7, hospital: 1-4-5-7, factory: 1-4-5-7}" from the independent layer-shared layer-independent layer, respectively, training the model under the sampling correspondence acquired until convergence, and calculating the translation quality score on a verification set, re-randomly sampling the correspondence, repeating until the translation quality score on the verification set is the highest. In other words, the correspondence between the label and the layer masker may be randomly set first, and then the model may be trained so that the model has the highest translation quality score under the randomly determined relationship.

(3) Determining the running layer in the translation model based on the selected layer masker.

The running layer may be a layer structure where the translation model has a better translation effect in the corresponding domain. The layer masker may be in the form of a vector, and each element in the vector is used to indicate whether each layer in the translation model is a running layer.

For example, if the layer masker is (1,0,0,0,1), the first mask is 1, the first layer may be set as the running layer, and the second mask is 0, the second layer may be set as the non-running layer.

In operation S1004, the translation model including the running layer is used to acquire the translated content.

Specifically, a layer structure is selected of the translation model with more accurate translation effects in the corresponding domain, that is, the running layer performs encoding and decoding tasks to acquire translated content, and other non-running layers may not perform encoding or decoding tasks, which may improve translation accuracy while improving translation efficiency.

The following may further explain the process of determining the running layer with specific examples.

Figure 11:
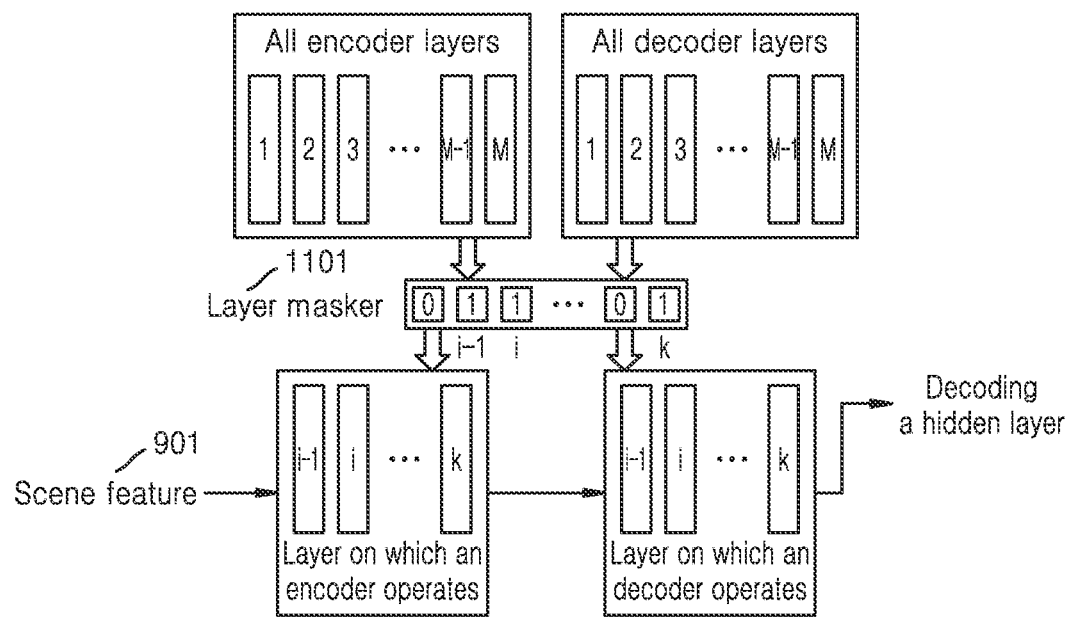
FIG. 11 illustrates a diagram of a process for determining a running layer according to an embodiment.

FIG. 11 illustrates a diagram of a process for determining a running layer according to an embodiment. As shown in FIG. 11, determining the running layer in the translation model based on the domain related scene information may include the following operations:

(1) Acquiring the domain label, and (2) acquiring the layer masker through the layer masker selector, the layer masker selector may pre-define the label-mask correspondence, for example, it may receive the label-mask correspondence preset by the user. The layer masker is a vector including of 0, 1. The i-th value 0 means not to select the i-th layer, and the value 1 means to select the i-th layer. If the i-th mask of the layer masker vector is 1, then the i-th layer is set as the actual running layer, if the i-th mask is 0, the i-th layer is set as the non-running layer. The decoded hidden layer is obtained after the scene features through the actual running layer of the encoder and the decoder, and this hidden layer may be used as the input of the decoder softmax (output layer).

In the above process, from the 1-M encoder layers and 1-M decoder layers, the i-kth encoding running layer is selected, that is, the actual running layer of the encoder shown in the figure, and the i-kth decoding running layer is selected, that is, the actual running layer of the decoder shown in the figure, according to the layer masker.

Figure 12:
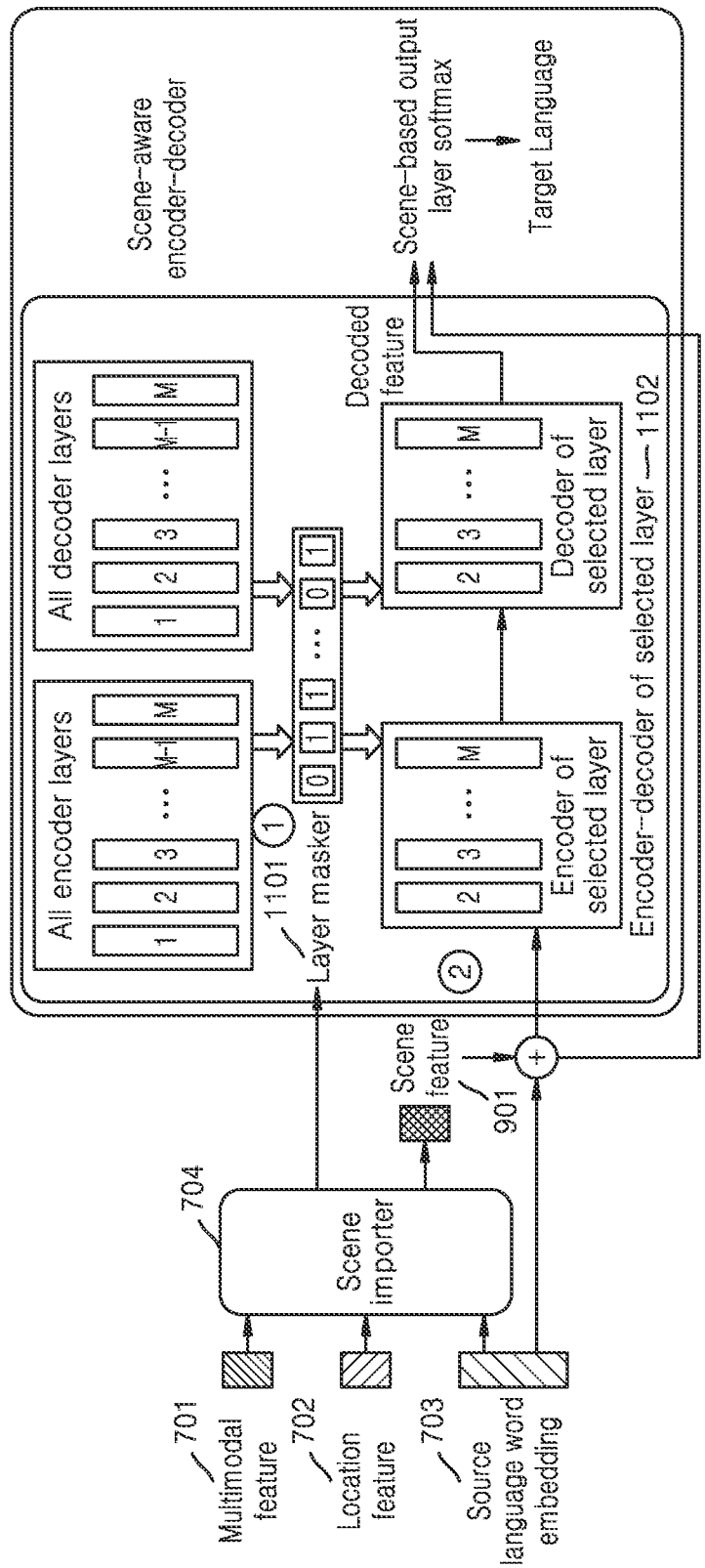
FIG. 12 illustrates a diagram of a multimodal translation method according to an embodiment.

FIG. 12 illustrates a diagram of a multimodal translation method according to an embodiment. As shown in FIG. 12, the encoder-decoder of the selected layer may be further explained below in combination with examples.

In the disclosure, the encoder-decoder of the selected layer 1102 may also be referred to as the layer-selected encoder-decoder. The encoder-decoder of selected layer 1102 may dynamically select the running layer based on the layer masker 1101 and is used to reduce the storage size. Specifically, it may work according to the following operations:

1) selecting the running layer in all encoder layers and decoder layers and building the encoder-decoder of the selected layer 1102, 2) running the encoder-decoder of the selected layer 1102 as a general encoder-decoder. Existing methods separate models for different domains, and there is no shared layer between different models. Although the domains are different, some information extraction layers are common. Therefore, the disclosure may use one model to process all domains through the shared layer, and keep some independent layers to deal with the differences between different domains. Different independent layers may also contribute the model focusing on scene features to reduce translation errors.

The encoder-decoder of the selected layer 1102 contributes to deal with storage problems, use layer maskers to share layers to reduce storage size. The following may further explain the reason why the encoder-decoder of the selected layer 1102 may reduce the size of the model storage compared with the solution using different models in different domains.

Figure 13:
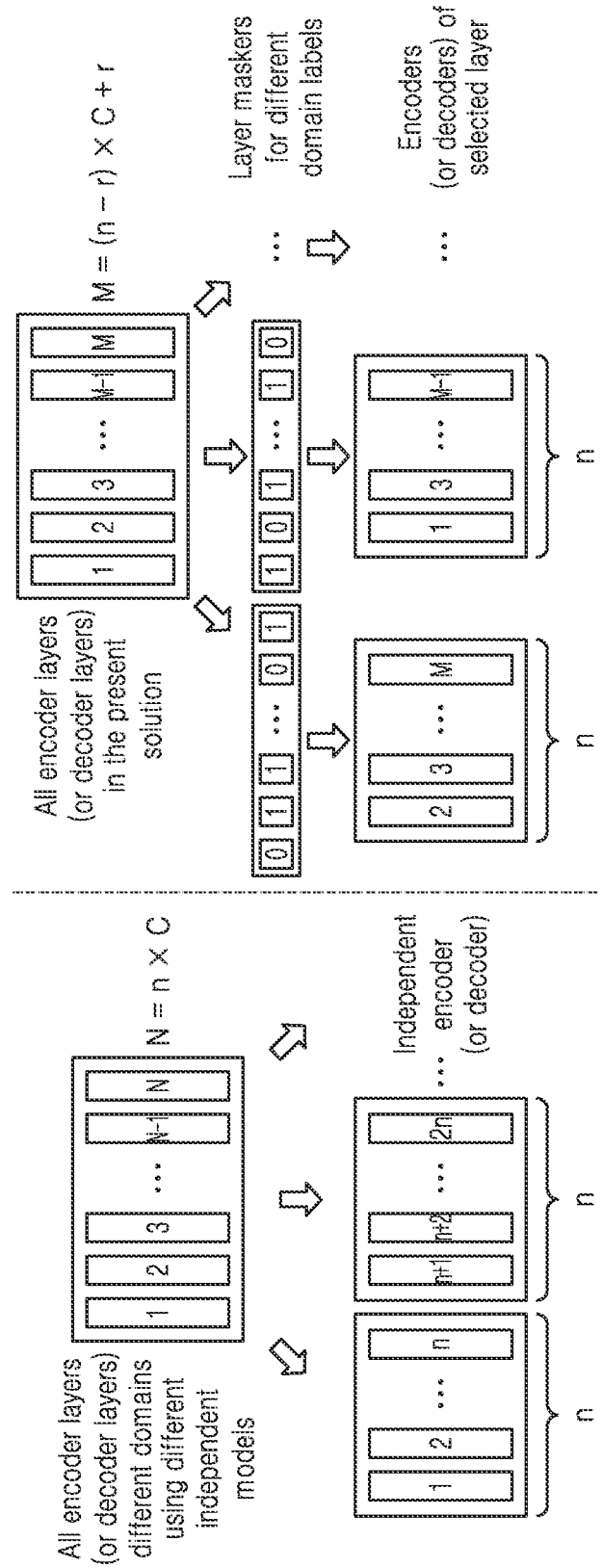
FIG. 13 illustrates a diagram of the comparison between an independent model a process for determining a running layer according to an embodiment.

FIG. 13 illustrates a diagram of the comparison between an independent model a process for determining a running layer according to an embodiment. As shown in FIG. 13, assuming that C (C≥1) is the domain being processed, indicating that the domain label, layer masker 1101, encoder/decoder (using E/D in the following description instead) are also equal to C, n is the layer number in each E/D, E (r≥0) is the shared layer number in E/D, r is the number of shared layers, M is the total layer number of E/D, N is the total number of independent layers in E/D. Therefore, M, N may be expressed as the following Equations:

$$M=(n-r)\times C+r \quad (2)$$

$$N=n\times C \quad (3)$$

$$N-M=r\times(C-1) \quad (4)$$

From Equation (4), the solution may save r×(C−1) layers storage. r≥0, C≥1, the storage of the disclosure is smaller than the storage of independent models set, separately. The larger r and C, the more storage space the model of the disclosure may save. The left side of FIG. 13 shows a solution that uses different independent models in different domains. Each domain in the solution uses an independent encoder-decoder, and no sharing and multiplexing of encoder layer or decoder layers is performed. The right side of FIG. 13 shows the solution of the disclosure. In the solution of the disclosure, some layers may be shared between different domains, and some independent layers are reserved to deal with the differences between different domains. The layer masker 1101 of different domain labels is used to determine the encoder-decoder of the selected layer 1102 in each domain, and the encoder-decoder of the selected layer 1102 perform translation to obtain the translated content in the target language.

Figure 14:
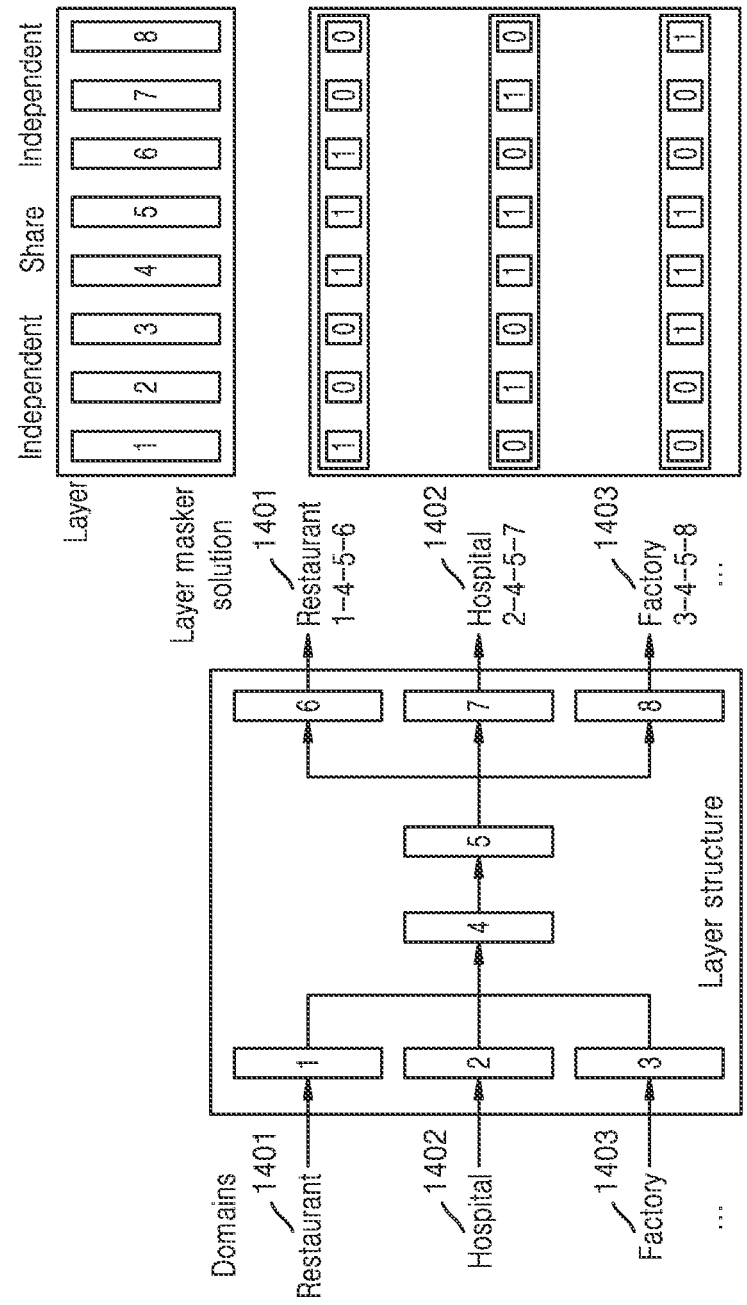
FIG. 14 illustrates a diagram of a process for determining a running layer based on a layer masker according to an embodiment.

FIG. 14 illustrates a diagram of a process for determining a running layer based on a layer masker according to an embodiment. As shown in FIG. 14, in an example, different layer maskers may be selected according to different domain labels. In FIG. 14, if the "restaurant" 1401 corresponds to the 1-4-5-6 layers, it means that the "restaurant" domain selects 1, 4, 5, and 6 layers for running, and the "hospital" 1402 corresponds to the 2-4-5-7 layers, indicating that "hospital" domain selects the 2, 4, 5, and 7 layers for running, and the "factory" 1403 corresponds to 3-4-5-8 layers, indicating that the "factory" domain selects the 3, 4, 5, and 8 layers for running. It may be seen that layers 1, 2, and 3 are independent layers for each domain, layers 4 and 5 are shared by all domains, and 6, 7, and 8 are independent layers for each domain.

In this example, all layers may be numbered and a vector is used to represent the logic of the current layer structure. In the vector, the values 0 and 1 may be set. The vector value in the location corresponding to each layer indicates whether to select the layer, where 0 means no, and 1 means yes. The vector is similar to a mask, which may be referred to as a layer masker, and each domain label has a corresponding layer masker, such that the layer masker may represent the corresponding domain label.

Specifically, the layer masker may be pre-defined by the layer structure in the encoder-decoder, and is unchanged during training. In the above example, the translation model selected by the layer may use the parameter sharing of the shared layer (shared layers in FIG. 14 are layers 4 and 5) to reduce memory usage, and the independent layer (independent layers in FIG. 14 are layers 1 to 3 and 6 to 8) may ensure that the unique information of each category is not lost. At least one of running layers may include at least one of independent layers for the domain label and at least one of shared layers.

In the above embodiment, by selecting different layers of the encoder-decoder for decoding according to the domain label, multiple domain labels share certain layer parameters, which reduces memory consumption.

In addition, the layer structure is selected, of the translation model with a more accurate translation effect in the corresponding domain, that is, the running layer performs encoding and decoding tasks to obtain translated content, and other non-running layers may not perform encoding or decoding tasks, which may improve translation accuracy while improving translation efficiency.

In a possible implementation of the embodiment of the disclosure, in operation S403, acquiring translated content in a target language using a translation model, based on the domain related scene information may include determining the candidate words according to the domain related scene information.

Specifically, the determining candidate words according to the domain related scene information may include fusing the source text semantic information extracted from the multimodal input with the domain related scene information to acquire a third fusion feature, performing, using the feedforward neural network, feature extraction on the third fusion feature, calculating the selection probability of each word in the target language candidate word set according to the output of the feedforward neural network, and determining the candidate words according to the selection probability of each word in the target language candidate word set.

The fusion may be the concatenating of the source text semantic information with the domain related scene information. In the disclosure, the third fusion feature may also be referred to as a scene intensive source language word embedding. Specifically, a preset number of words with the largest selection probability may be selected as candidate words, or words with a selection probability greater than a preset threshold may be selected as candidate words. The process of acquiring candidate words may be further elaborated below in combination with specific examples.

Figure 15:
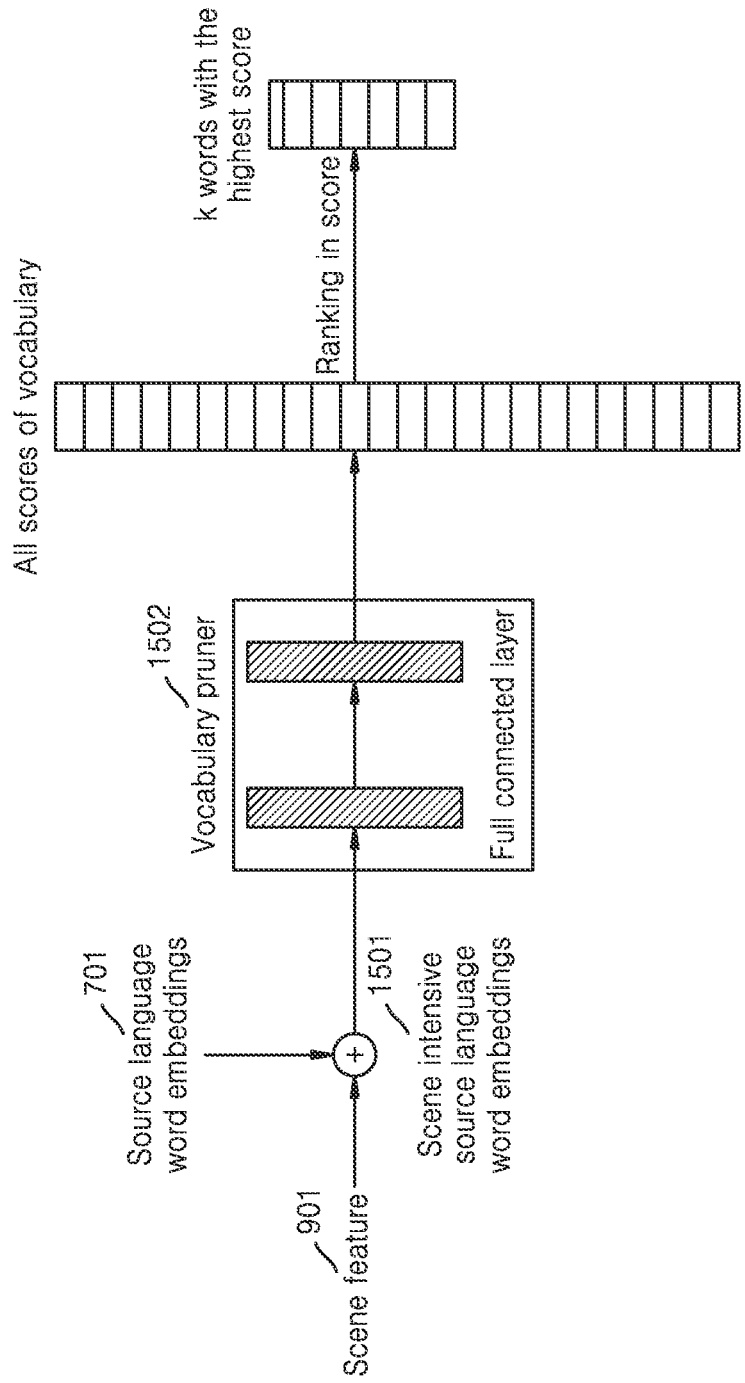
FIG. 15 illustrates a diagram of a process for determining top-k candidate words according to an embodiment.

FIG. 15 illustrates a diagram of a process for determining top-k candidate words according to an embodiment. In an example, as shown in FIG. 15, the determining candidate words may include:

Fusing the scene features 901 (i.e., the domain related scene information) and source language word embeddings 701 (i.e., source text semantic information), to generate scene intensive source language word embeddings 1501 (i.e., a third fusion feature) obtained after fusion (such as concatenating).

Determining candidate words may further include acquiring the scores of all vocabularies after the scene intensive source language word embedding are subjected to the fully connected layer and the Sigmoid layer. All vocabularies contain all target language words, and the scene intensive source language word embedding are subjected to the fully connected layer and the Sigmoid layer to obtain the selection probability of each target language word in all vocabularies. The fully connected layer and the Sigmoid layer constitutes a vocabulary pruner, which may also be referred to as the vocabulary pruner 1502.

Determining candidate words may further include ranking the vocabulary according to the score (i.e., selection probability), and selecting the k words with the highest score as the target vocabulary, that is, selecting K candidate words, the vocabulary may run through the entire translation process, until the input of next translation model changes.

In the disclosure, the k words with the highest scores are used as the target vocabulary, that is, selecting k candidate words (also referred to as at least one of candidate words) may also be referred to as top-k candidate words, or top-k vocabulary, or top-k vocabulary table. determining the translated content from the candidate words according to the output of the translation model. Specifically, the determining the translated content from the candidate words according to the output of the translation model may include:

Inputting the third fusion feature to the translation model to obtain the output words of the translation model, repeatedly inputting the last output words to the translation model to obtain the corresponding output words, until an end character is generated, and combining the output words each time to obtain the translated content. The process of obtaining translated content may be further explained below in combination with specific examples.

Figure 16:
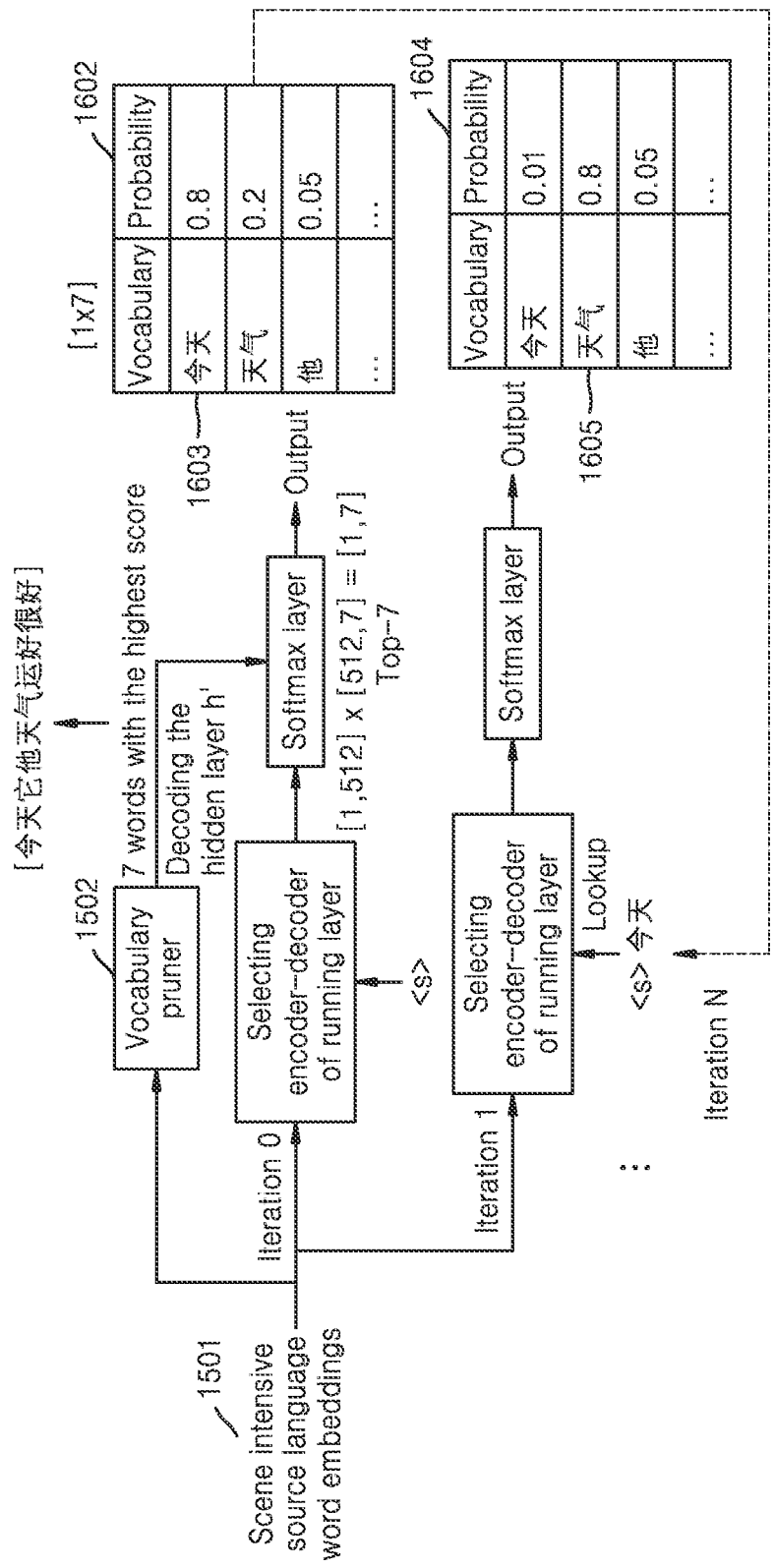
FIG. 16 illustrates a diagram of a process for determining a target language based on a scene intensive source language word embedding according to an embodiment.

FIG. 16 illustrates a diagram of a process for determining a target language based on a scene intensive source language word embedding according to an embodiment. As shown in FIG. 16, in an example, the specific process of acquiring translated content may include acquiring the scene intensive source language word embedding 1501 with the text to be translated "it is good today!", that is, fusing the scene feature 901 and the source language word embedding 701, and generating the scene intensive source language word embedding 1501 after concatenating (that is, the third fusion feature), Acquiring translated content may include inputting the third fusion feature acquired to the vocabulary pruner 1502 (i.e., translation model), and acquiring the 7 words with the highest score as target candidate words (i.e., candidate words).

Acquiring translated content may include inputting the third fusion feature acquired to the codec of the selected running layer (i.e., the running layer in the translation model), and inputting start flag of the 0-th iteration "<s>" to the codec of selected running layer to generate the decoded hidden layer of the 0-th iteration.

Acquiring translated content may include inputting the decoded hidden layer acquired to the softmax layer to calculate the probability distribution of the candidate words, the size of the decoded hidden layer is [1×512], and the output size of the vocabulary pruner is [512×7], the output size of the softmax layer is [1,7].

Acquiring translated content may include acquiring the word "today" generated in the 0-th iteration according to the probability distribution, Acquiring translated content may include generating the decoding hidden layer of the first iteration by the word "today" generated.

Acquiring translated content may include repeating the previous three operations (operation 4 to operation 6) until the end identifier is generated, and fusing the words generated each time, thereby acquiring the translated content "today's weather is good". In 0-th iteration, a candidate word 1603 in table 1602, which has a highest probability, means "today". In 1-th iteration, a candidate word 1605 in table 1604, which has a highest probability, means "weather".

It may be seen from the above example that through the vocabulary pruner, the range of translation word candidates is reduced to 7 words related to the scene and the source language. Compared with the original search space 30,000 words, the search space of this method is reduced, which may further increase translation speed.

In the foregoing embodiments, by first screening original translation candidate words, some candidate words related to the scene and the source language are selected, with a higher probability of selection, and then a search space may be reduced in a subsequent decoding process, such that search calculation may be effectively reduced and translation efficiency may be improved. In order to better understand the above-mentioned multimodal translation method, an example of the multimodal translation of the present invention is described in detail below.

Figure 17:
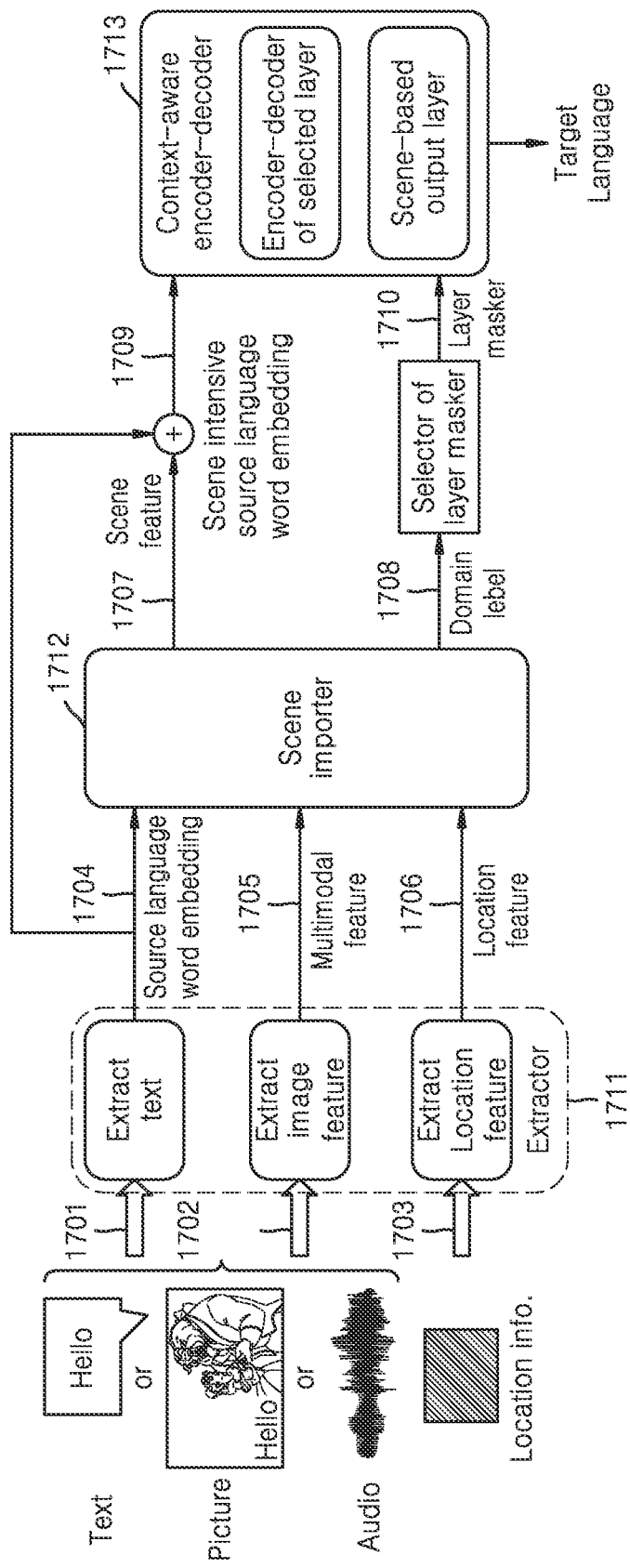
FIG. 17 illustrates a flowchart of a multimodal translation method according to an embodiment.

FIG. 17 illustrates a flowchart of a multimodal translation method according to an embodiment. As shown in FIG. 17, in an example, the multimodal translation method of the disclosure may include after the system used to implement the multimodal translation method receives multimodal input, such as text, image (also referred to as picture), audio (such as voice), video and other signals, a source language text to be translated is directly extracted from the texts, or the text in the image is extracted through scene text recognition, or the text is extracted as the text to be translated through speech recognition and mapped to the source language word embedding by the lookup word embedding table, that is, the source text semantic information.

After the system receives image/audio/video and other inputs, the image features or voice features are extracted as multimodal features, if image and voice are input at the same time, the image features and voice features are extracted separately and then fused into multimodal features.

After the system receives the input of location information, the location-related words or phrases are extracted by location keywords, and the location information are mapped as location features by the lookup word embedding table, that is, the location entity semantic information.

Through the scene importer, the source language word embedding, the multimodal feature, and the location feature are fused into scene features, that is, the location entity semantic information, the source text semantic information and multimodal feature are fused to acquire the domain related scene information, and output the domain label.

The scene features and the source language word embedding features are fused to generate the scene intensive source language word embeddings, that is, fusing the domain related scene information and the source text semantic information to acquire a third fusion feature. The layer masker selector generates a layer masker after receiving the domain label. The scene intensive source language word embedding (that is, the third fusion feature) and the layer masker are input to the encoder-decoder, to select the running layer according to the layer masker, determine the running layer in the translation model, and form the encoder/decoder of selection layer.

The vocabulary is pruned by the output layer according to the scene intensive source language word embedding (that is, the third fusion feature), that is, determining candidate words, The target language text in the pruned vocabulary is generated, that is, generating the translated content of the target language according to the determined candidate words.

The features corresponding to each label in FIG. 17 are as follows.

1701 & 1702—Multimodal inputs (such as text, image, or audio).

1703—location information, such as "near Capital Mall (Taiyanggong)", may be acquired from the map application.

1704—source language word embedding: a floating-point matrix of size [T×hidden unit], where T is the length of the source language text, the hidden unit is the neuron number, and the source language word embedding represents the word-level source shallow semantic information.

1705—multimodal feature: a floating-point matrix of size [I×hidden unit], used to represent an image or a piece of voice, where I is the output channel, and the hidden unit is the number of neurons in each channel. Multimodal features include the edge information of the image, the color information of the image and the abstractive information of the image, and at least one of pitch information, vocal information and phonetic information in the frequency domain of a voice.

1706—location feature: a floating-point vector of size [L×hidden unit], representing the location information obtained from the map application, where L is the information length and the hidden unit is the neuron number, for example, if 512-dimensional neuron is used, The location of "Sanya Bay, Hainan" may be expressed as [3×512], and the location feature contains the location entity semantic information.

1707—scene feature: the scene feature is a floating-point matrix of size [C, hidden unit], representing the fusion context, where C=L+T+I. L, T, I are quoted from signals 4, 5, 6, and scene features include scene information that may be used to distinguish domains.

1708—domain label, 1709—scene intensive source language word embedding: fusion or concatenation of features described above.

1710—layer selector: a vector indicates the running layer. The vector size is the same as the layer number. For example, the layer masker [1,0,0,1,1,1,0,0] indicates that the 0-th, 3-rd, 4-th, and 5-th layers are used.

In the disclosure, the candidate words determined by the vocabulary pruning may also be referred to as a vocabulary.

The multimodal translation method of the disclosure mainly includes three parts: an extractor 1711, a scene importer 1712, and a context-aware encoder-decoder 1713.

The extractor 1711 may extract a feature and text from the given information. The text may be acquired directly, or extracted through image using Scene Text Recognition (STR) technology, or extracted through audio using ASR technology, the location information may be extracted through an attention model. The extractor 1711 outputs the source language word embeddings, the multimodal features and the location features.

The scene importer 1712 may acquire the output of all extractors 1711, and output the scene features and layer maskers at the same time. The scene features are used as additional scene features, and the layer masker is used to set the model parameters in the context-aware encoder-decoder 1713. Different domain labels correspond to different scene features and different layer maskers.

The context-aware encoder-decoder 1713 includes an encoder-decoder based on the selected layer and the scene-based output layer. The encoder-decoder of the selected layer may be used in combination with the layer masker selector to select the running layer in the model to reduce the storage size. The scene-based output layer is used to speed up the calculation duration and deal with ambiguity problems.

The scene importer 1712 may solve the ambiguity problem and is used to extract scene features and layer maskers. The layer maskers are used by the encoder-decoder of the selected layer.

The context-aware encoder-decoder 1713 may help to deal with ambiguity, storage and latency problems, use layer maskers to select the running layers to reduce storage size, and use the screened vocabulary to speed up calculation duration and eliminate ambiguity.

The scene importer 1712 in FIG. 17 may be further described below in conjunction with examples.

Figure 18:
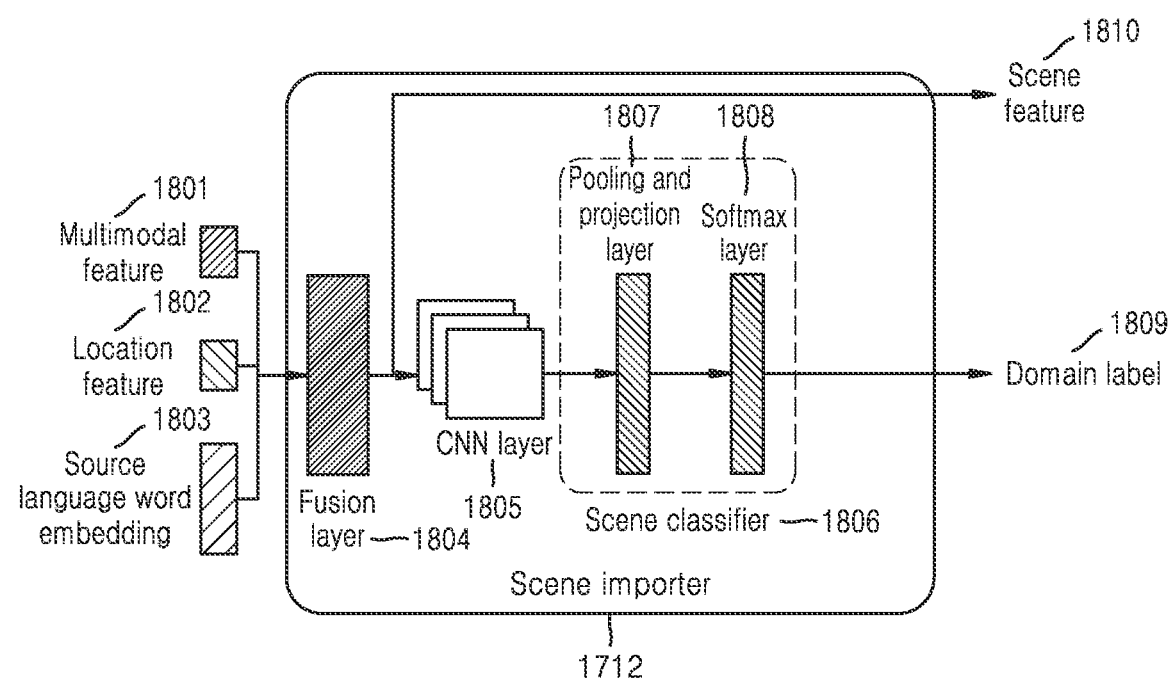
FIG. 18 illustrates a flowchart of the scene importer according to an embodiment.

FIG. 18 illustrates a flowchart of the scene importer according to an embodiment As shown in FIG. 18, in an example, the scene importer 1712 in FIG. 17 may be used to perform Acquiring multimodal features 1801, location features 1802 (i.e., the location entity semantic information) and source language word embeddings 1803 (i.e., the source text semantic information), and Fusing the features through the fusion layer 1804 to generate scene features 1810 (i.e., the domain related scene information), the specific fusing methods are as follows:

Method 1: fusing the source text semantic information with multimodal features to obtain the first fusion feature, determining the weight of the first fusion feature using the attention network based on the location entity semantic information, weighting the first fusion feature according to the weight, fusing the weighted first fusion feature with the location entity semantic information to obtain the domain related scene information.

Method 2: fusing the source text semantic information with multimodal feature to obtain the first fusion feature, performing attention weighting, using the location entity semantic information, on the first fusion feature generated, generating the domain related scene information based on the first fusion feature and the weighted feature generated.

The scene importer 1712 in FIG. 17 may be used to perform generating the domain category, that is, the domain label 1809, after the scene features through the CNN layer 1805, the pooling and projection layer 1807, and the softmax layer 1808. Scene classifier 1806 includes the pooling and projection layer 1807, and the softmax layer 1808.

In the above example, when the domain related scene information is obtained by fusion, it may focus on the role of location information, or the reinforcement of objective knowledge to subjective knowledge, so as to more accurately determine the translated content in the target language.

The scene importer 1712 in FIG. 17 may be further described below in conjunction with examples.

Figure 19:
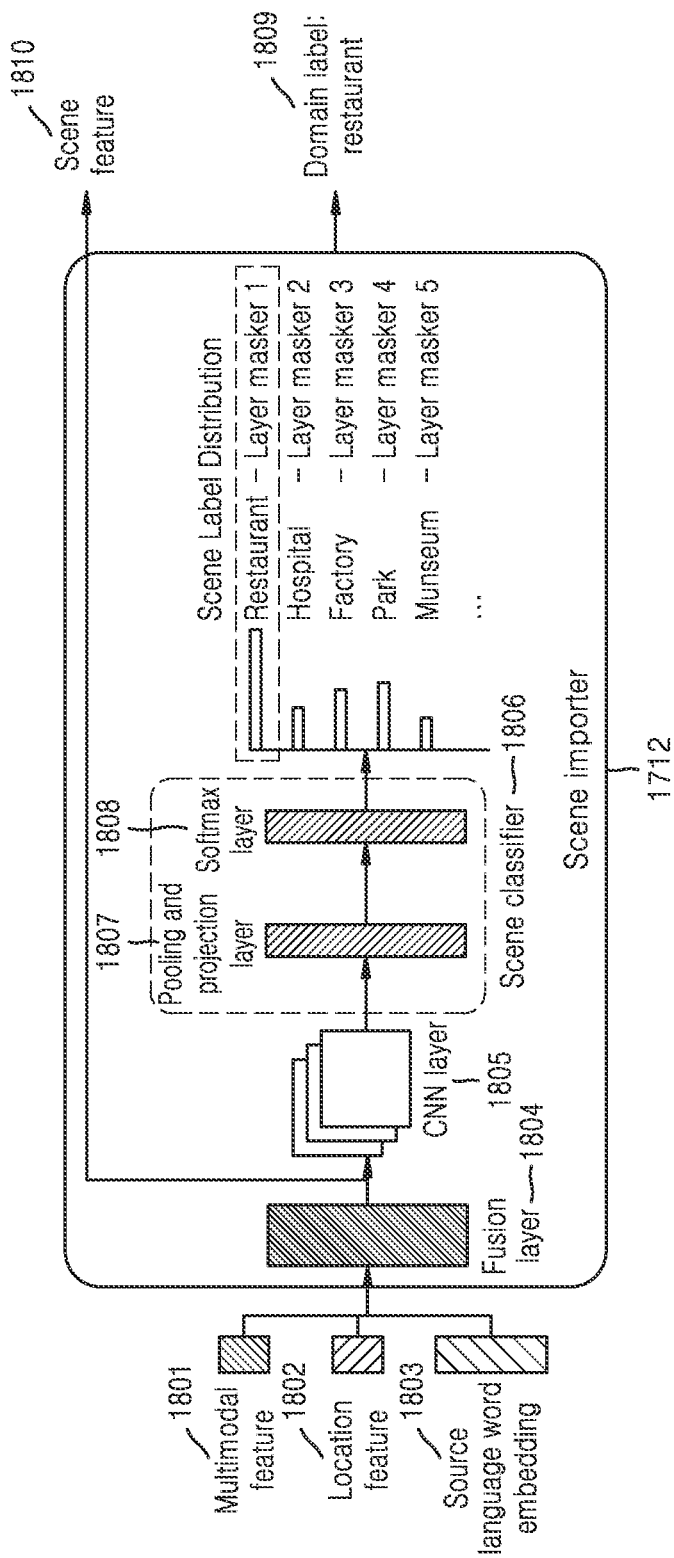
FIG. 19 illustrates a flowchart of the scene importer according to an embodiment.

FIG. 19 illustrates a flowchart of the scene importer according to an embodiment. As shown in FIG. 19, in an example, the scene importer 1712 in FIG. 17 may be used to perform the following steps: Step 1: acquiring multimodal features 1801, location features 1802 (i.e., location entity semantic information) and source language word embeddings 1803 (i.e., source text semantic information).Step 2: fusing the features to generate scene features 1810 (i.e., domain related scene information). Step 3: generating the distribution of the domain label 1809, after the domain related scene information through the CNN layer 1805, the pooling and projection layer 1807, and the softmax layer 1808, as shown in FIG. 19, the domain label 1809 is the layer masker scheme 1 corresponding to the restaurant, the layer masker scheme 2 corresponding to the hospital, the layer masker scheme 3 corresponding to the factory, the layer masker scheme 4 corresponding to the park, and the layer masker scheme 5 corresponding to the museum and so on, selecting the domain label layer masker scheme with the highest probability according to the distribution, that is, the final domain label for the restaurant, and selecting the layer masker scheme 1 corresponding to the restaurant.

In the above example, different layers of the encoder-decoder are selected for decoding according to the domain label, and multiple domain labels share some layer parameters, which reduces memory consumption.

Figure 20:
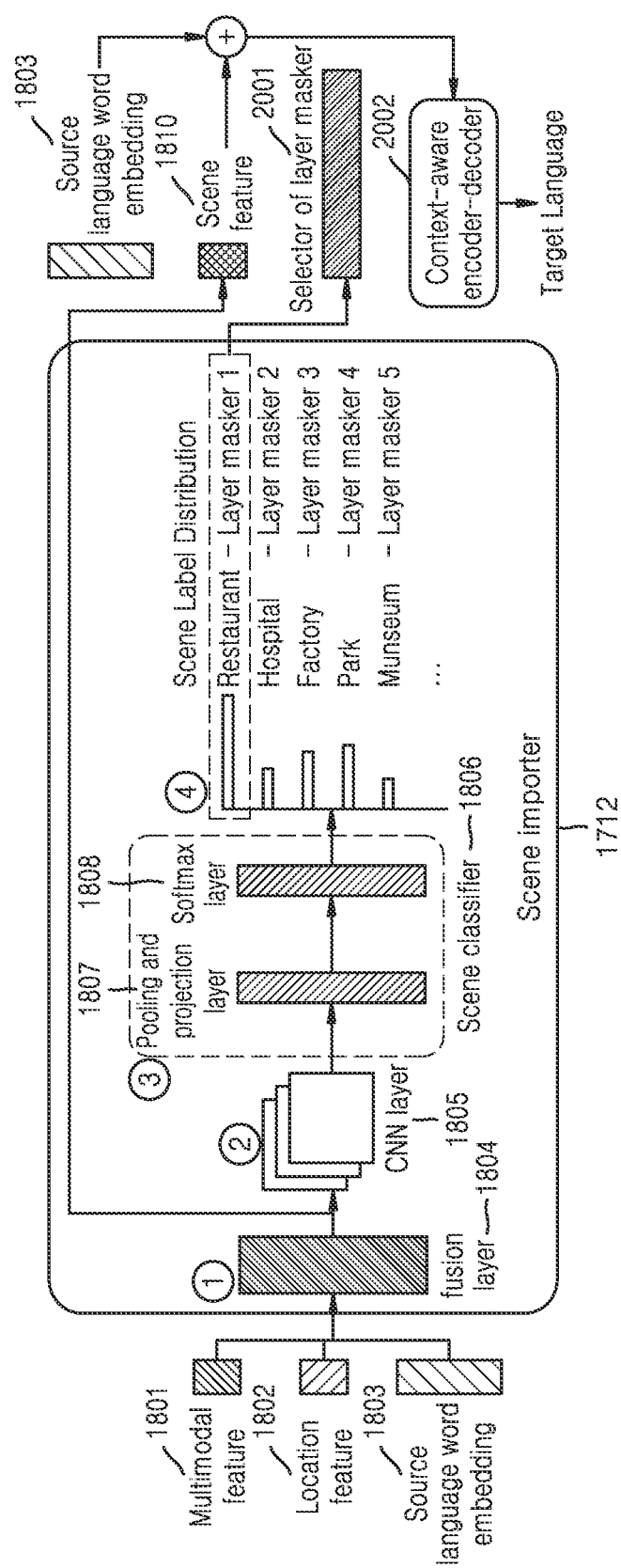
FIG. 20 illustrates a flowchart of a multimodal translation method according to an embodiment.

FIG. 20 illustrates a flowchart of a multimodal translation method according to an embodiment. As shown in FIG. 20, the multimodal translation method of the disclosure is further explained in combination with the scene importer 1712 described in FIG. 19.

The scene importer 1712 is used to extract scene features 1810, and extract layer maskers for context-aware encoders and decoders 2002, take multimodal features 1801, location features 1802, and source language word embeddings 1803 as inputs, and give the scene features 1810 by the fusion layer 1804, CNN 1805, and scene classification calculation domain label distribution.

The scene importer 1712 may be configured to perform the following operations:

(1) Fusing multimodal features 1801, location features 1802 and source language word embeddings 1803 by the fusion layer 1804, and outputting the scene features 1810 after the fusion processing (2) Extracting, using the CNN layer 1805, deep features from scene features 1810

(3) Calculating the domain label distribution through the scene classifier 1806, the scene classifier 1806 may include pooling and projection layer 1807 and softmax layers 1808, or other classifiers may be used. (4) Selecting the domain label 1809 with the highest probability. through the domain label distribution, and then finding corresponding layer masker through the layer masker selector 2001. Before training, all layer maskers are pre-defined by the context-aware encoder-decoder structure and may not change. The context-aware encoder-decoder 2002 is obtained through the layer masker. Based on the source language word embedding 1803 and scene features 1810, the context-aware encoder-decoder may be used to obtain the translated content of the target language.

The fusion layer 1804 may help to solve the ambiguity problem, so as to better focus on useful information, and provide scene features 1810 to the context-aware encoder-decoder 2002, through fusing location features 1802. The disclosure is the first application of a scene importer 1712 to multimodal machine translation.

In one embodiment of the present disclosure, the translation method may include determining a domain label related to the location information based on the scene information, selecting a layer masker corresponding to the domain label based on domain label distribution, and determining an at least one of running layers in the translation model corresponding to the layer masker. The at least one of running layers may include at least one independent layer corresponding to the layer masker and at least one shared layer. The determining of the domain label related to the location information based on the scene information comprises: performing feature extraction on the scene information using a CNN, and determining the domain label using a context classification network based on output of the CNN.

Figure 21:
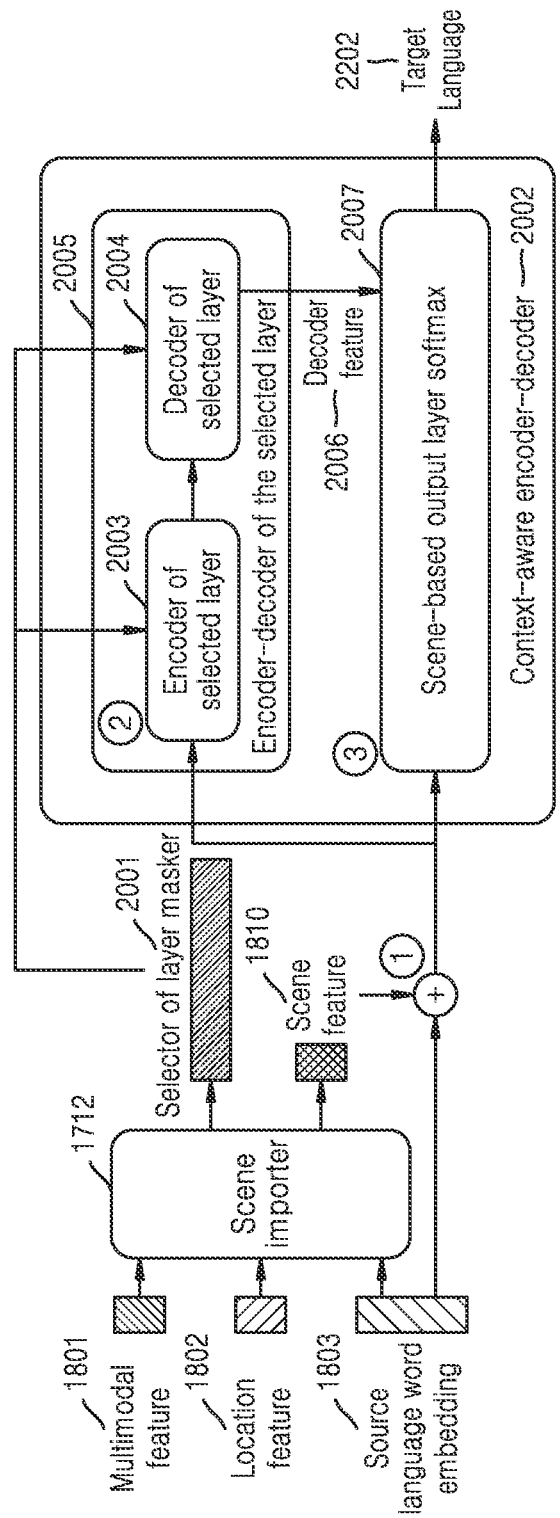
FIG. 21 illustrates a flowchart of a multimodal translation method according to an embodiment.

FIG. 21 illustrates a flowchart of a multimodal translation method according to an embodiment. As shown in FIG. 21, the following may further describe the context-aware encoder-decoder 2002 in combination with an example.

The context-aware encoder-decoder may take the source language word embedding 1803, scene feature 1810 and layer masker as input, and output the translated content of the target language 2202. The context-aware encoder-decoder 2002 may operate as follows:

(1) The source language word embedding 1803 is the general input of the encoder/decoder, and the scene feature 1810 is important in this solution. In order to enhance the scene feature 1810, the source language word embedding 1803 and the scene feature 1810 may be fused as an input.

(2) The layer masker output by the layer masker selector 2001 may be applied to the encoder-decoder of the selected layer 2005 to set the layer parameters and reduce the storage size, the encoder-decoder of the selected layer 2005 may output the decoded features 2006, that is, the decoded features 2006 in the figure.

(3) The scene-based output layer softmax 2007 takes the scene intensive source language word embedding and decoded features 2006 as input, and outputs the target language text, which may handle delay problem and ambiguity problem.

As the last module, the context-aware encoder-decoder 2002 plays an important role in the model of the disclosure. Here, the encoder-decoder of the selected layer 2005 may be used as the solution to the storage problem, and the scene-based output layer softmax 2007 is used as the present solution to speed up the model inference time to deal with the delay problem, and deal with ambiguity problem by adding scene features.

The encoder-decoder of the selected layer 2005 is conducive to dealing with storage problems, and reducing the storage size by reusing the layer masker. The encoder-decoder of the selected layer 2005 including encoder of selected layer 2003 and decoder of selected layer 2004. The scene-based output layer softmax 2007 is conducive to dealing with delay and ambiguity problems, it uses the screened vocabulary to speed up the inference time and eliminate ambiguous word.

Figure 22:
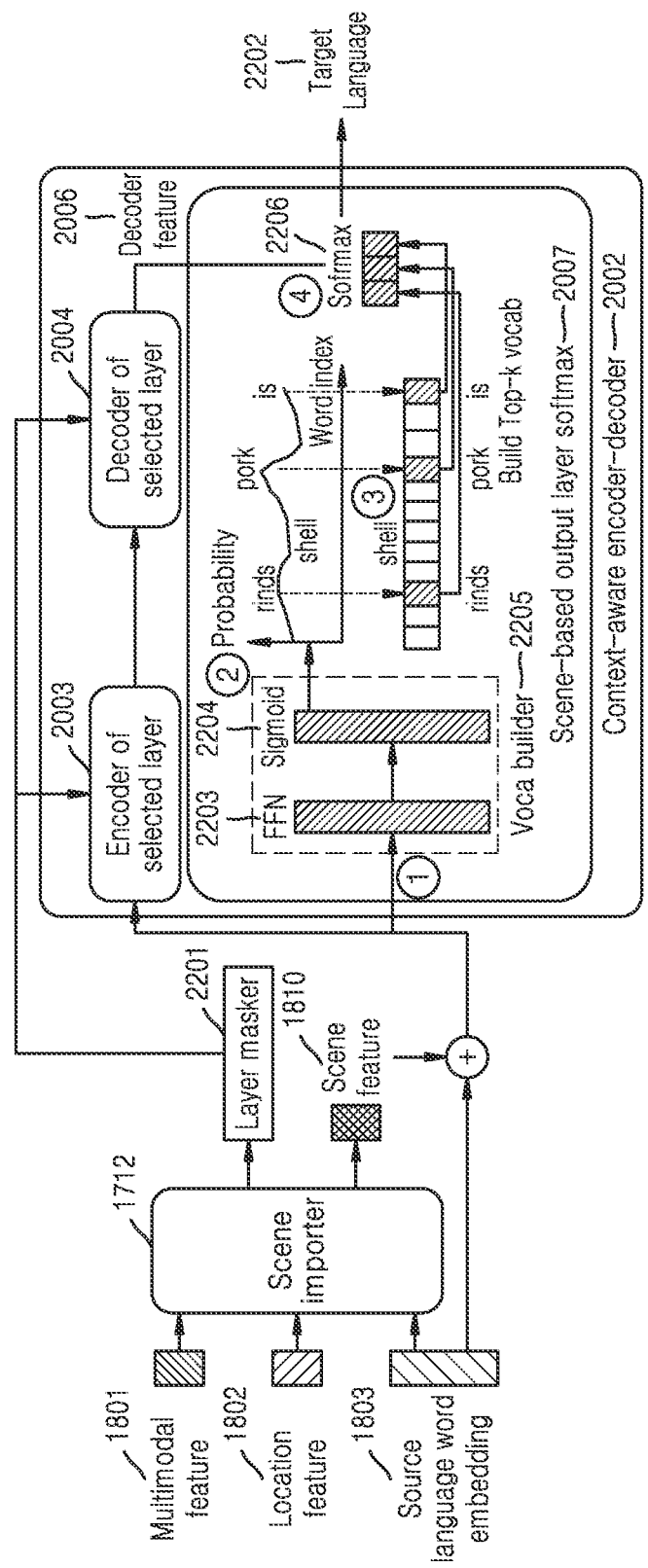
FIG. 22 illustrates a flowchart of a multimodal translation method according to an embodiment.

FIG. 22 illustrates a flowchart of a multimodal translation method according to an embodiment. As shown in FIG. 22, further description is given in combination with specific examples.

The calculation duration is an important indicator of the translation model. In order to speed up the model calculation duration, the scene-based output layer softmax (also referred to as word-context softmax) 2007 may be used to generate the target language 2202 with top-k vocabulary, that is, the target language 2202 including the k candidate words with the highest probability may be generated, and ambiguity may also be avoided. The translation model may include the following operations:

(1) Fusing the source language word embeddings 1803 with scene features 1810, using FFN layer 2203 to extract features, (2) Calculating, using the sigmoid function 2204, the target occurrence probability of all words in the full vocabulary. FNN 2203 and sigmoid functions 2204 form the vocabulary builder 2205, (3) Building the Top-k vocabulary by extracting the candidate words of the top-k target with the highest occurrence probability, and (4) Calculating, using the softmax 2206, the probability of Top-k candidate words based on the decoded features 2006, and generating the target language 2202 text according to the probability.

It should be noted that in each sentence translation, Top-k vocabulary may be created only once. Since the amount of calculation in Top-k vocabulary is much smaller than in the full vocabulary, the scene-based output layer softmax 2007 is much faster than ordinary softmax. In addition, the Top-k glossary may delete some ambiguous words in order to eliminate ambiguity. The scene-based output layer softmax 2007 is conducive to processing delay and ambiguity problems, and the Top-k vocabulary is used to speed up the inference time and eliminate ambiguous words.

Figure 23:
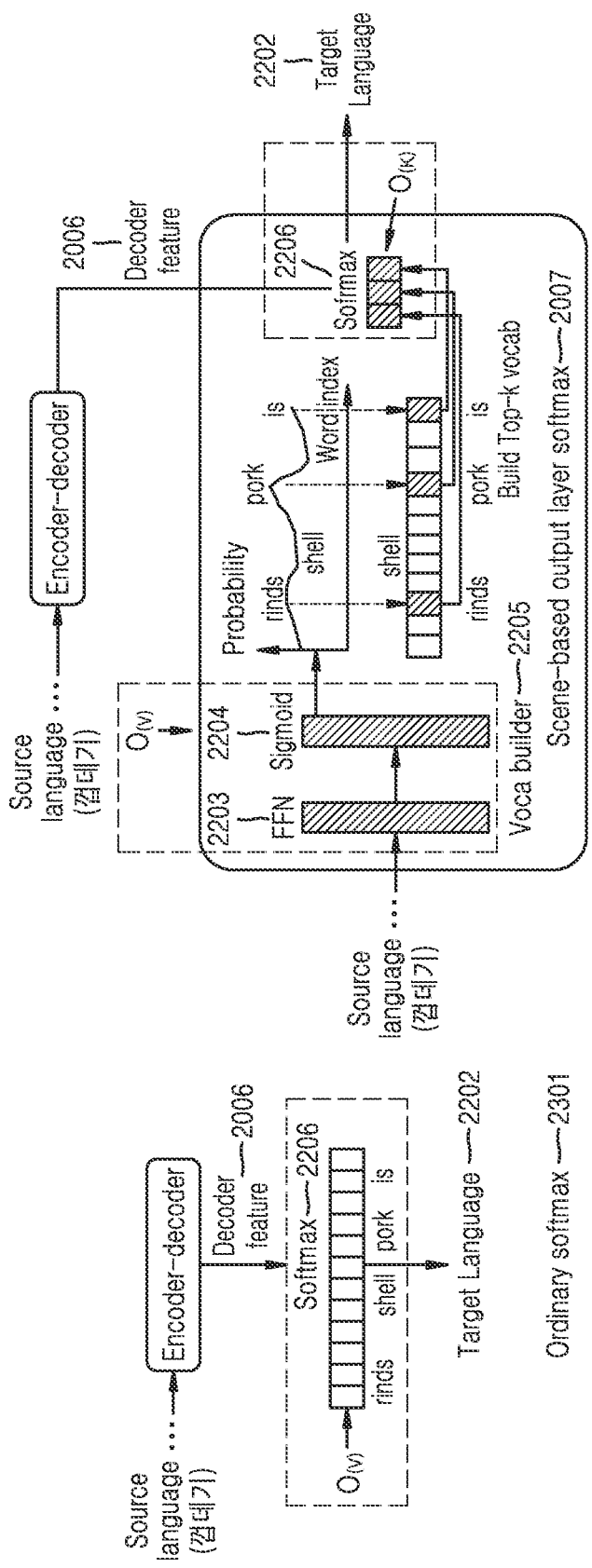
FIG. 23 illustrates a diagram of comparison between multimodal translation methods according to an embodiment.

FIG. 23 illustrates a diagram of comparison between multimodal translation methods according to an embodiment. As shown in FIG. 23, the following may illustrate the effect of the scene-based output layer softmax 2007 of the disclosure comparing with the ordinary softmax 2301.

The machine translation task may output the target language words at a glance to build a complete sentence, and the decoded function may play a role in controlling the logical order of the output words. Therefore, in the machine translation task, the decoder and softmax may be used multiple times to generate the final sentence.

Assuming that the number of words in a sentence is N (N≥1), the target language vocabulary is V, and the Top-k vocabulary is K(K<<V). The computing complexity of getting a word is $O_{(V)}$ in ordinary softmax 2301, and is $O_{(K)}(O_{(K)}<<O_{(V)})$ in the scene-based output layer softmax 2007, the computing complexity of establishing Top-k vocabulary is $O_{(V)}$. It should be noted that the Top-k vocabulary may only be created once in a sentence translation. In ordinary softmax 2301 (denoting as $O_{NS}$) and scene-based output layer softmax 2007 (denoted as $O_{WS}$), the computing complexity of acquiring the final sentence may be expressed as the following Equations:

$$O_{NS} = N \times O_{(V)} \tag{5}$$

$$O_{WS} = O_{(V)} + N \times O_{(K)} \tag{6}$$

$$O_{NS} - O_{WS} = N \times (O_{(V)} - O_{(K)}) - O_{(V)} = (N-1) \times (O_{(V)} - O_{(K)}) - O_{(K)} \tag{7}$$

From Equation (7), it may be known that: when N=1, $O_{NS}$ is smaller than $O_{WS}$, (since $O_{(K)}$ is smaller), but as N increases, $O_{NS}$ may be much larger than $O_{WS}$ in consideration of $O_{(K)}<<O_{(V)}$. Considering N>1 in most cases, the scene-based output layer softmax 2007 may be faster than ordinary softmax 2301. In other words, the use of scene-based output layer softmax 2007 may speed up the model's processing latency.

Figure 24:
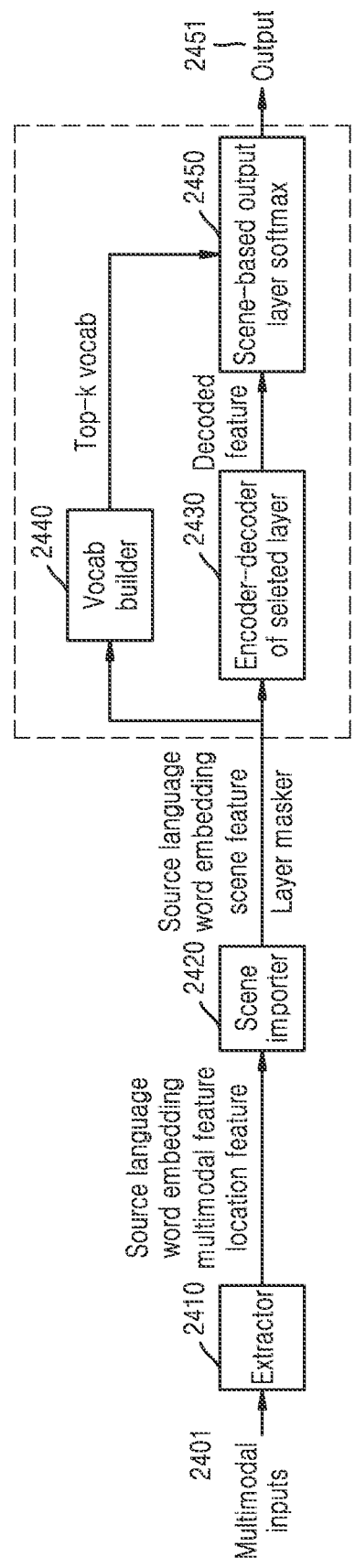
FIG. 24 illustrates a flowchart of a multimodal translation method according to an embodiment.

FIG. 24 illustrates a flowchart of a multimodal translation method according to an embodiment. The multimodal translation method of the disclosure may be further explained in combination with specific examples.

The multimodal input 240 may include at least one of text, image, audio, video, and biometric signal, and also location information.

The extractor 2410 may be configured to extract information from multimodal input, such as text information from image/audio as source language word embeddings, content information from image/audio as multimodal feature, and location features from the location information.

The scene importer 2420 may be configured to fuse these information together and giving the fused scene features, classify the domain to which the source language word embedding belongs, and give the corresponding layer masker.

The vocabulary builder 2440 may be configured to use scene features and source language word embeddings to build a top-k vocabulary, where the top-k vocabulary may be used in the scene-based output layer softmax 2450 to speed up the inference time of model.

The encoder/decoder of the selected layer 2430 may be configured to determine, using the layer masker, the running layer, and translate the source language word embedding with scene feature, and giving the decoded feature.

The scene-based output layer softmax 2450 may be configured to, instead of the entire vocabulary, setting the top-k vocabulary as the target output vocabulary, and calculate the word probability in the target output vocabulary and giving the best word as the final output.

The output 2451 may be configured to display the final output to the user.

Figure 25:
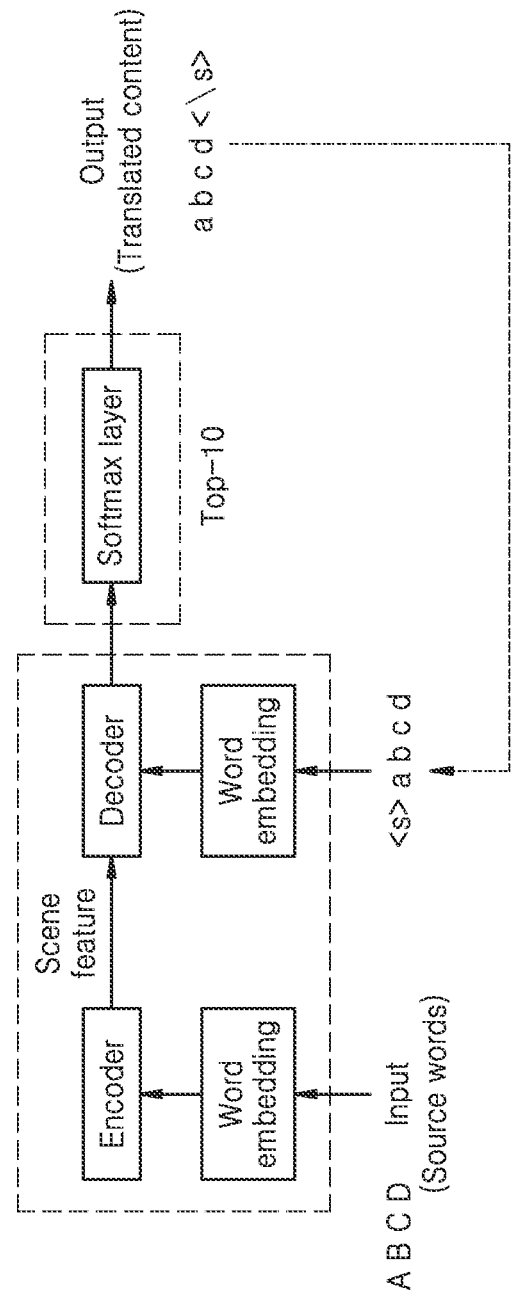
FIG. 25 illustrates an encoding and decoding process of the encoder-decoder of the selected layer in FIG. 24 according to an embodiment.

FIG. 25 illustrates an encoding and decoding process of the encoder-decoder of the selected layer in FIG. 24 according to an embodiment. The encoding and decoding process of the encoder/decoder of the selected layer 2430 in FIG. 24 may be further described below in combination with examples.

The encoder-decoder may be usually based on a sequence-to-sequence structure, and the flowchart for calculating consecutive words is usually the default structure of Neural Machine Translation (NMT).

As shown in FIG. 25, the output includes word sequences, and the next word is determined based on the translation result of the previous word. For example, the input is the source language "A B C D", first the source language "A B C D" is subjected to the encoder and the scene features are given. Then, the embedded scene features with the start label (i.e., <s>) may be subjected to the decoder and softmax layer, where the first output "a" is acquired, then the scene features with "<s>" and "a" are subjected to the decoder and softmax layer, where the second output "b" is acquired. Then, the embedded scene features with "<s>", "a" and "b" are subjected to the decoder and softmax layer, where the third output "c" is acquired, and so on, until acquiring all words "<s> a b c d", they may all be subjected to the decoder and softmax layer, and the end label (i.e., <\s>) is acquired, the translation task is completed. After ignoring the special label (<s>, <\s>), the final output containing all words ("a b c d") is acquired. The size of the feature vector output after decoding in the figure is [1×512], the top-k vocabulary may contain top-10 vocabulary, and the size of feature output by the softmax layer is [512×10]. If the complete vocabulary is used, taking the number of words in the complete vocabulary being 30,000 as an example, the weight of the softmax layer is [512×30000], and the acquired feature size of the translated content is [1×30000].

Figure 26:
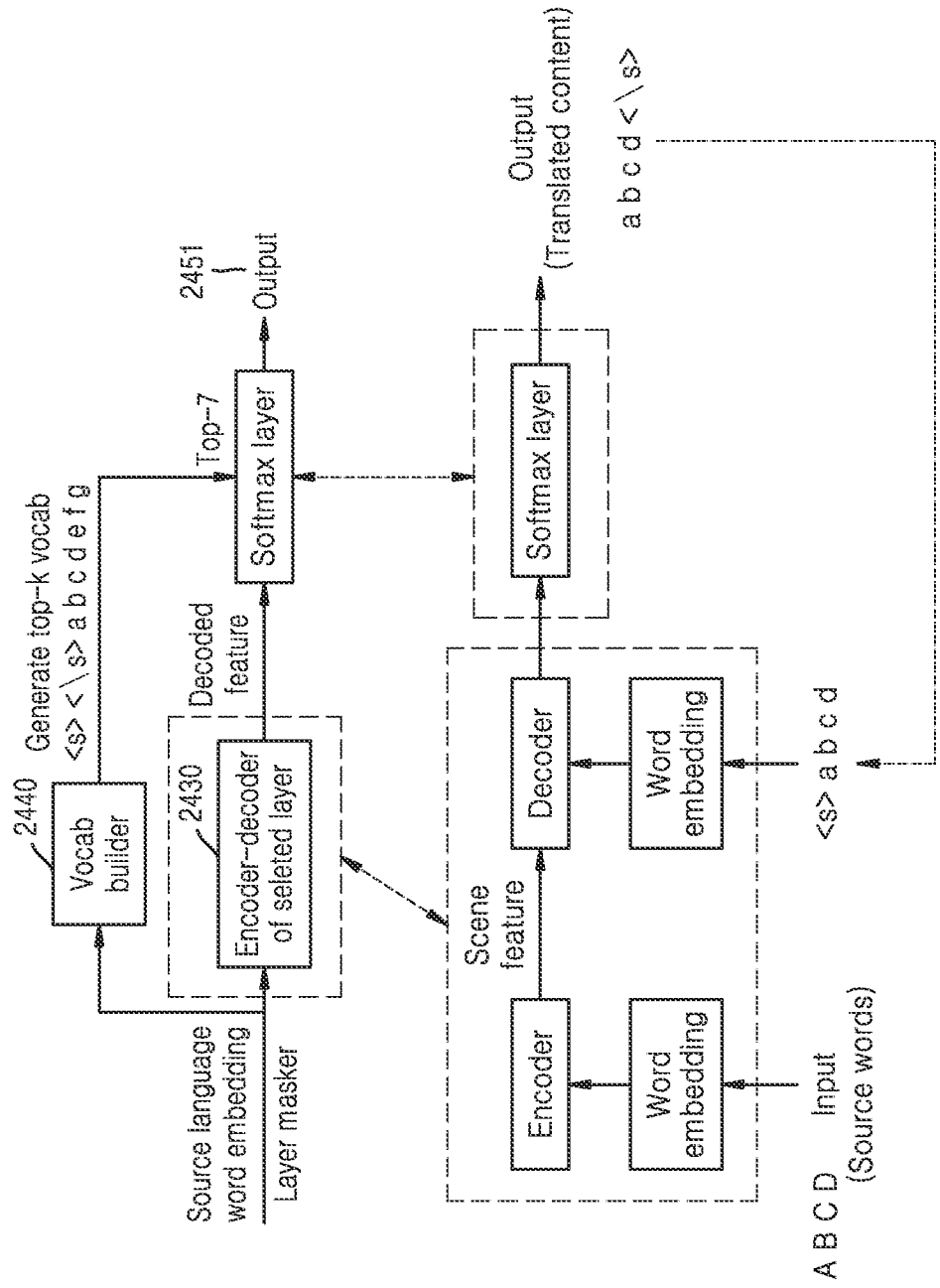
FIG. 26 illustrates a diagram of a process for selecting top-k candidate words using a vocabulary builder in a multimodal translation process according to an embodiment.

FIG. 26 illustrates a diagram of a process for selecting top-k candidate words using a vocabulary builder in a multimodal translation process according to an embodiment. As shown in FIG. 26, it shows the scheme of selecting, using the vocabulary builder 2440, top-k candidate words in the multimodal translation process. For the vocabulary builder, it only works once on a sentence, and the top-k candidates of all words at this time are fixed ("a b c d"). Therefore, the vocabulary builder uses the same input as the second NMT and only uses it once for a sentence. It may be said that it is in the preparation stage. The top-k candidate words are used for all output, that is, the top-7 candidate words shown in the figure: [<s><\s> a b c de f g] (a b c d<\s>). If the candidate words are not selected, the candidate words used in the cycle of translation process are [<s><\s> a b c d . . . x y z]. Therefore, selecting, using the vocabulary builder, the top-k candidate words may effectively reduce the computing complexity during the cycle of translation process.

Figure 27:
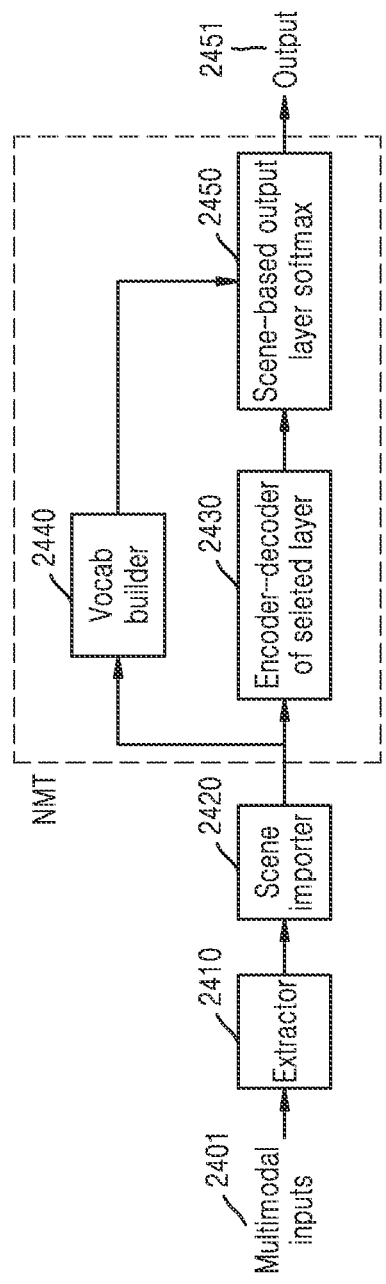
FIG. 27 illustrates a flowchart of a multimodal translation method according to an embodiment.

FIG. 27 illustrates a flowchart of a multimodal translation method according to an embodiment. As shown in FIG. 27, the multimodal translation method of the disclosure in the example is shown, in which:

The multimodal input 2401 may include multimodal information that users need to translate, including image/audio, location information, The extractor 2410 may be configured to extract information from multimodal input and giving the extracted results, including text information from image/audio as source language word embedding, content information from image/audio as multimodal feature, and location feature from location information.

The scene importer 2420 may be configured to fuse the information together and giving the fused scene information, classify the domain to which the source language word embedding belongs, and give the corresponding layer masker.

The vocabulary builder 2440 may be configured to use scene information and source language word embeddings to build a top-k vocabulary. The top-k vocabulary may be used in the softmax of word context to speed up the inference time of model, The encoder/decoder of the selected layer 2430 may be configured to select the running layer according to the layer masker, translate the source language word embeddings with scene feature as usual, and give the decoding feature.

The scene-based output layer softmax (also referred to as scene-based softmax) 2450 may be configured to set the top-k vocabulary as the target output vocabulary instead of the entire vocabulary, calculate the word probability in the target output vocabulary and give the best word as the final output.

The output 2451 may be configured to display the final output to the user.

It is understood that the FFN layer in the vocabulary builder 2440 may be changed to other type of layers.

In order to illustrate the effect of the multimodal translation method of the disclosure using correct scene information, the following may further illustrate in combination with test data.

In order to verify the solution of the disclosure, considering that the encoder-decoder part of the selected layer is an important part of the solution of the disclosure, this part has been tested in some quick experiments. The translation direction of all experiments is from Chinese to English.

Three domains (hotel, hospital, market) are selected for the experiment, and 500,000 pairs of Chinese and English sentences are used in each domain for model training. Three text encoder-decoder models need to be trained for each domain. In the reference model (i.e., comparison model), the encoder-decoder uses four layers respectively. In the solution of the disclosure, two layers are used as shared layer and two layers are used as independent layer. Therefore, each domain also has 4 layers for encoder-decoder. Table 1 shows the experimental results. In table 1, the translation results in the target domain exist, the storage size of model and the inference time per sentence are better than those of the reference model.

TABLE 1

Comparison Of Translation Effect

| Method | BLEU (hotel) | BLEU (hospital) | BLEU (market) | Model Size | Calculation duration |
|---|---|---|---|---|---|
| Comparison method (without scene information) | 21.59 | 23.48 | 22.07 | 414.0M | 547.8 ms |
| Disclosure | 23.43 | 25.68 | 24.25 | 153.6M | 354.8 ms |

The same test set was used to test the translation quality in different domains of existing methods, and the results are shown in Table 2.

TABLE 2

Translation effect in existing methods

| Method | BLEU (hotel) | BLEU (hospital) | BLEU (market) |
|---|---|---|---|
| Translation in existing methods | 15.89 | 16.54 | 14.75 |

In Table 1 and Table 2, a higher Bilingual Evaluation Understudy (BLEU) score means good translation quality, model size: model storage size, in the existing methods, the total storage size of three models is regarded as the model size, inference time: the model inference time of each sentence may be calculated by the average inference time of 100 sentences.

Figure 28:
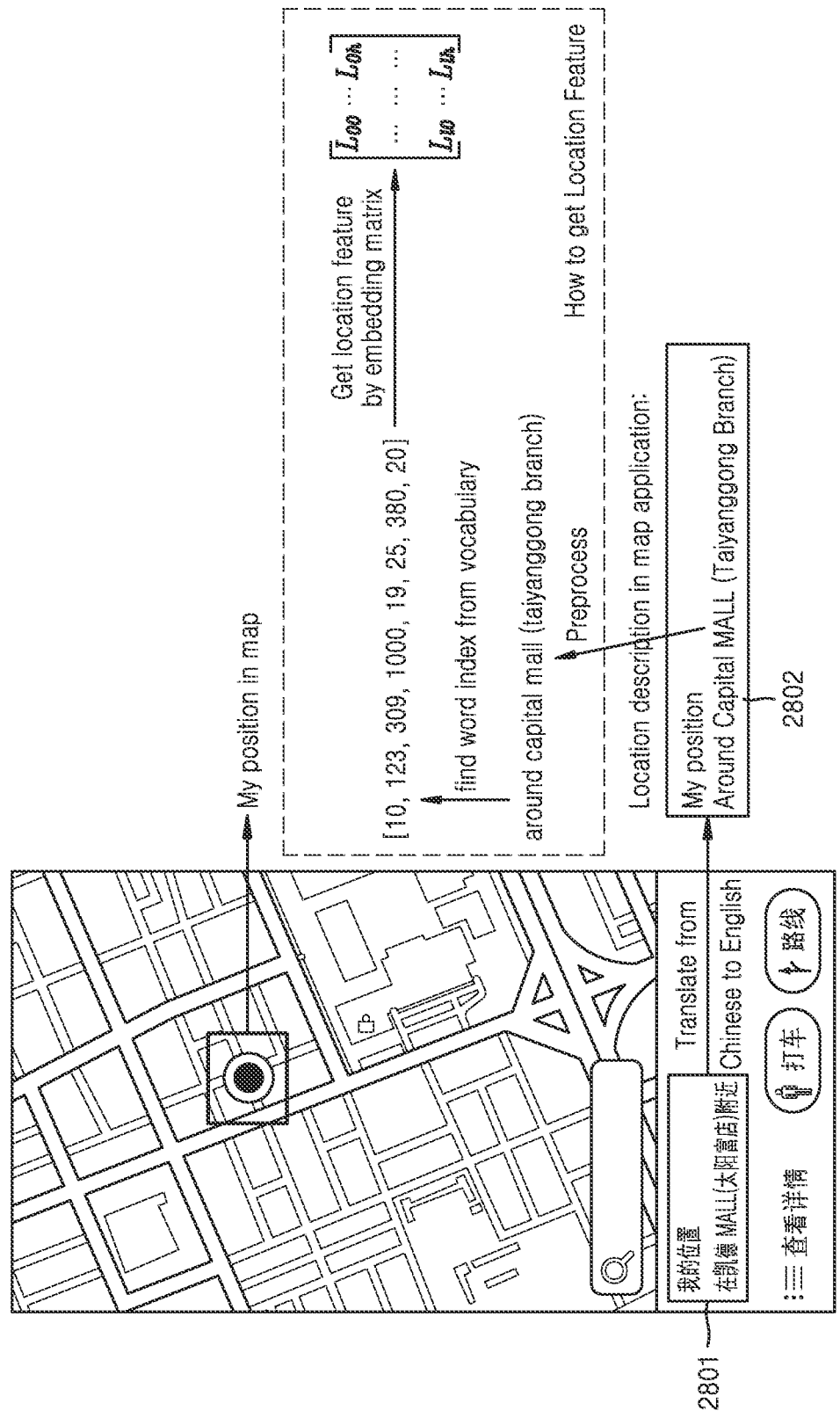
FIG. 28 illustrates a map application program interface according to an embodiment.

FIG. 28 illustrates a map application program interface according to an embodiment FIG. 28 shows the map application interface, indicating:

(1) The location information may be accessed in some way (set by a user itself or acquired from the map application), (2) How to describe the location information. Specifically, acquiring a location "around Capital Mall (Taiyanggong Branch)" (correspond to " 我的位置 ", " 在凱德 MALL( 太阳富店 ) 附近 " 2801 in FIG. 28) is translated to obtain "around Capital Mall (Taiyanggong Branch)" 2802, and then the vector corresponding to "around Capital Mall (Taiyanggong Branch)" 2802 is found (i.e., finding the word index from the vocabulary shown in figure), to obtain the location feature through the embedding matrix.

Figure 29:
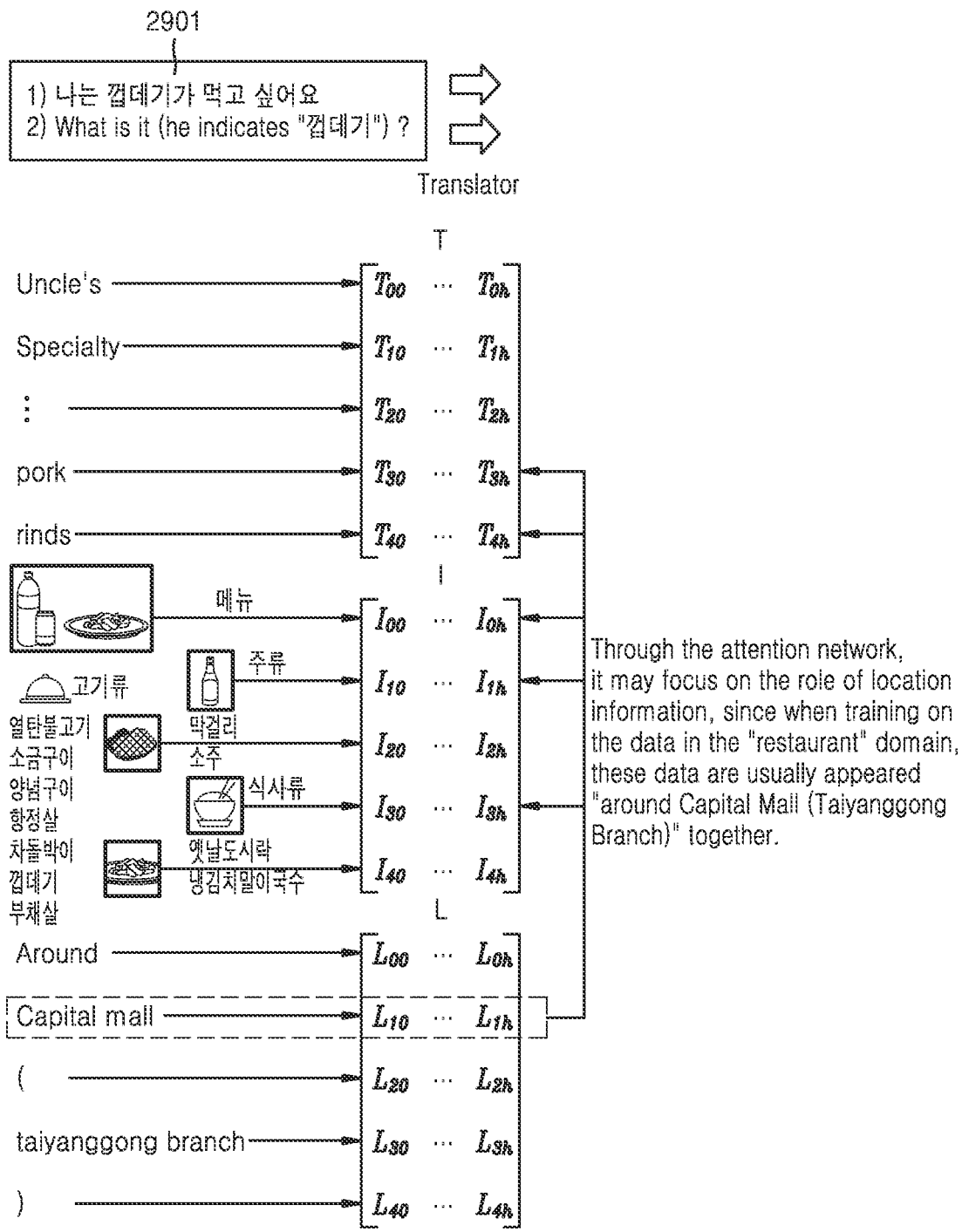
FIG. 29 illustrates a flowchart of acquiring scene information in a specific scene according to an embodiment.

FIG. 29 illustrates a flowchart of acquiring scene information in a specific scene according to an embodiment. FIG. 29 shows the translation process in a specific scenario.

When the user talks with the waiter, and there are obstacles in language communication, the user may pay attention to the menu. For example, if the user says " 나는 껍데기가 먹고 싶어요. " 2901, the waiter may point " 껍데기 ", and the user may ask "What is this?". In the translation process, other information "Uncle's specialty" and "pork rinds" may be added to acquire the source language word embedding T. The multimodal feature I is acquired according to the menu, the location feature L is acquired according to the location information "around Capital Mall (Taiyanggong Branch) (around Capital Mall (Taiyanggong Branch))" . Through the attention network, it may focus on the role of location information, since when training on the data in the "restaurant" domain, these data are usually appeared "around Capital Mall (Taiyanggong Branch)" together.

Figure 30:
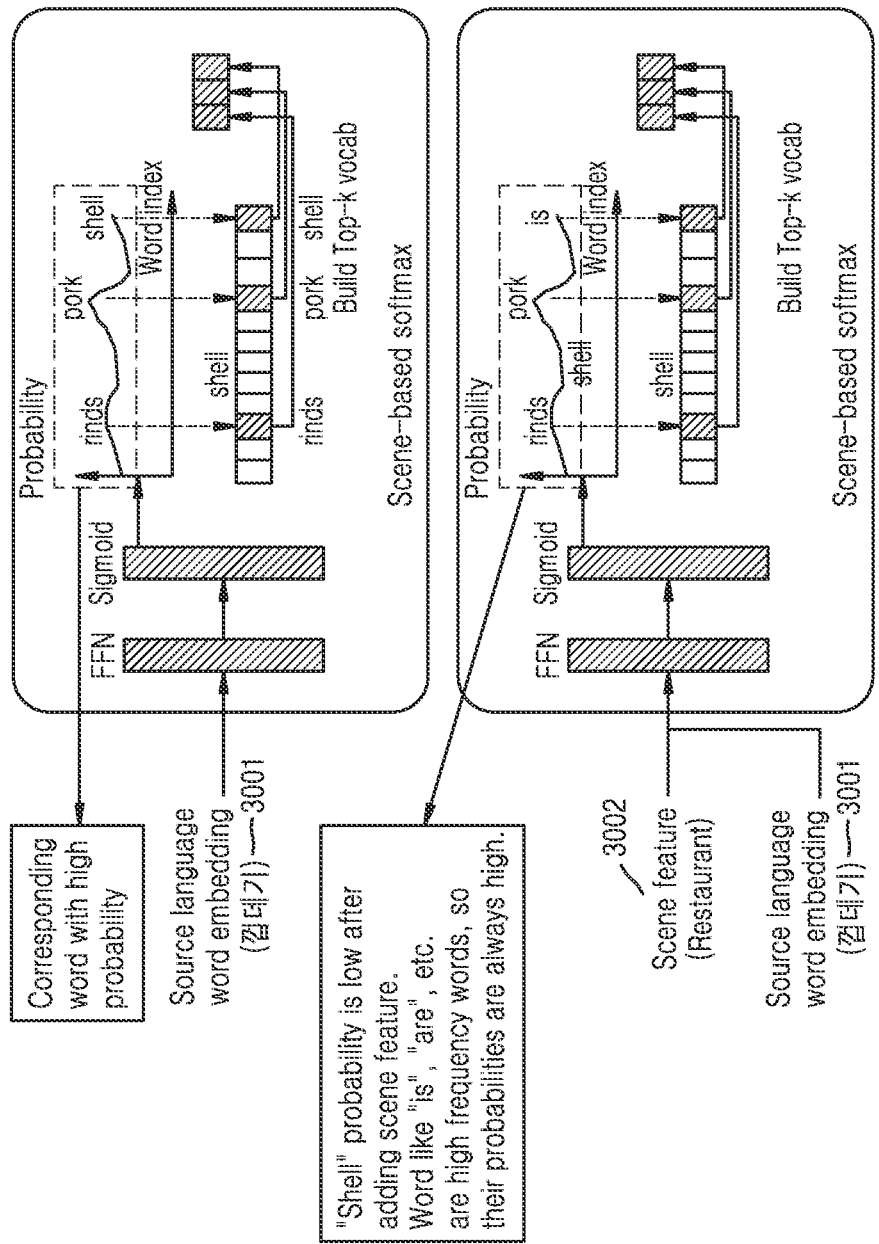
FIG. 30 illustrates a diagram of effect comparison before and after adding scene features according to an embodiment.

FIG. 30 illustrates a diagram of effect comparison before and after adding scene features according to an embodiment. As shown in FIG. 30, the FFN in the figure is used to understand the input information and extract the output information to input to sigmoid. It contains the mapping logic from the source language word embedding to the target. For example, source language word embedding of " 껍데기 " 3001 maps to ["shell", "Pork", "rinds", . . . ], In the figure, sigmoid is used to calculate the probability of each word appearing in the target language candidate word set. It may be regarded as the logic of decoding each word from the FFN layer.

When only the word " 껍데기 " is acquired, it may be known that the target language may contain ["shell", "pork", "rinds", "is", . . . ], which is easy for humans, and the same for neural networks. Therefore, the FFN layer is selected as an example to extract this mapping information, since it is simple and less complex, and other network layer structures may also be used.

However, when the scene feature of "restaurant" 3002 is added, a new target word list may be obtained, such as ["pork", "outer skin", "yes", . . . ].

The difference between sigmoid and softmax is that sigmoid is used to calculate the probability of each word, while softmax is used to calculate the probability of selecting a word in the vocabulary. Sigmoid may give the independent probability of all words, while softmax may give the probability calculated based on all words. For example, sigmoid may give ["shell" (0.85), "pork" (0.9), "rinds" (0.87), . . . ], the probability of each word may be each value in [0,1], softmax may give ["shell" (0.2), "pork" (0.35), "rinds" (0.33), . . . ], the sum of all word probabilities is 1. The current multimodal NMT model has two stages.

In the first stage, one NMT model is used for all domains, regardless of multi-domain problems, which may result in low translation quality.

In the second stage, different NMT models are used for different domains, which may require larger storage space, Requiring the corresponding domain model selected by user manually.

In addition, since there is a universal softmax layer in NMT, both stages face high latency problems.

Figure 31:
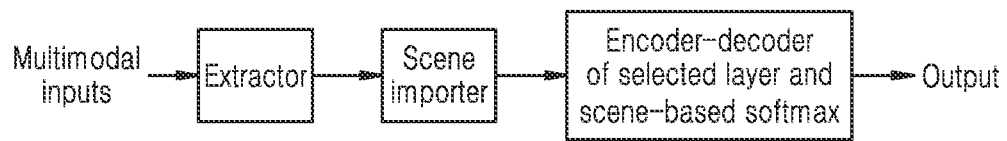
FIG. 31 illustrates a diagram of a process for automatically selecting a target domain using a scene importer according to an embodiment.

FIG. 31 illustrates a diagram of a process for automatically selecting a target domain using a scene importer according to an embodiment. A solution of the disclosure is as follows, as shown in FIG. 31.

Compared with the first stage, the solution of the disclosure has higher translation quality, since the scene importer is imported and different domain information is considered. Compared with the second stage, since the encoder/decoder of the selection layer is selected, the model size of the solution of the disclosure is smaller, and the target domain may be automatically selected. Compared with the first stage and the second stage, the solution of the disclosure has a lower delay due to the scene-based softmax.

Figure 32:
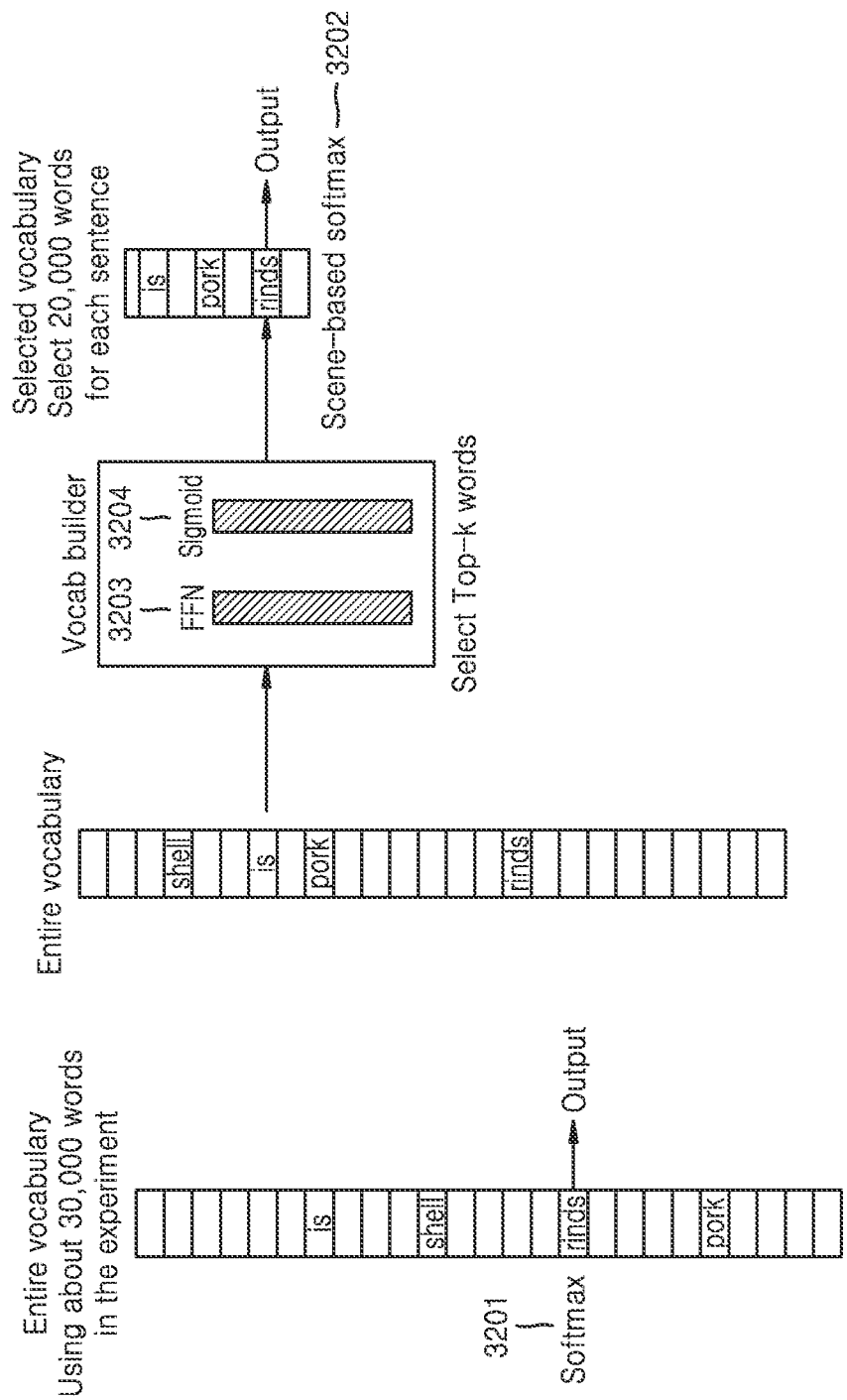
FIG. 32 illustrates a flowchart of a multimodal translation method according to an embodiment.

FIG. 32 illustrates a flowchart of a multimodal translation method according to an embodiment. As shown in FIG. 32, in the translation model, softmax 3201 searches the entire vocabulary (about 30,000) to find the best output, the scene-based softmax 3202 of the disclosure searches smaller selected vocabulary (about 2,000) to find the best output. This means that the scene-based softmax 3202 is much faster than the ordinary softmax. This is the reason why the solution of the disclosure is faster than the comparison model (the existing methods).

The following examples may illustrate the reasons why FFN 3203 and Sigmoid 3204 may speed up the inference time of model: Assuming that the source input is "A B C D", the target output is "a b c d", and the selected target vocabulary is "abcd . . . xyz", so the number of the target vocabulary is 26.

In the general model, for each word in the target output "a b c d", the softmax layer needs to calculate the probability of all words in the vocabulary "abcd . . . xyz", the computing complexity in the general model in the softmax 3201 may be 26*4, where, 26 is the vocabulary amount and 4 is the number of output words.

In the solution of the disclosure (scene-based softmax 3202), the probability of all words appearing in the final output word is firstly calculated, after acquiring these probabilities, the first k words are selected, such as "abcdefg". Then informing the softmax layer that, based on the source language word embedding and multimodal information, only these words may appear in the output, so the system calculates the probability of these first k words. Therefore, the calculation complexity of the disclosure may be 26×1+7×4, where, 26×1 is used to select the first k words, and 7*4 is used for the final output decision.

Figure 33:
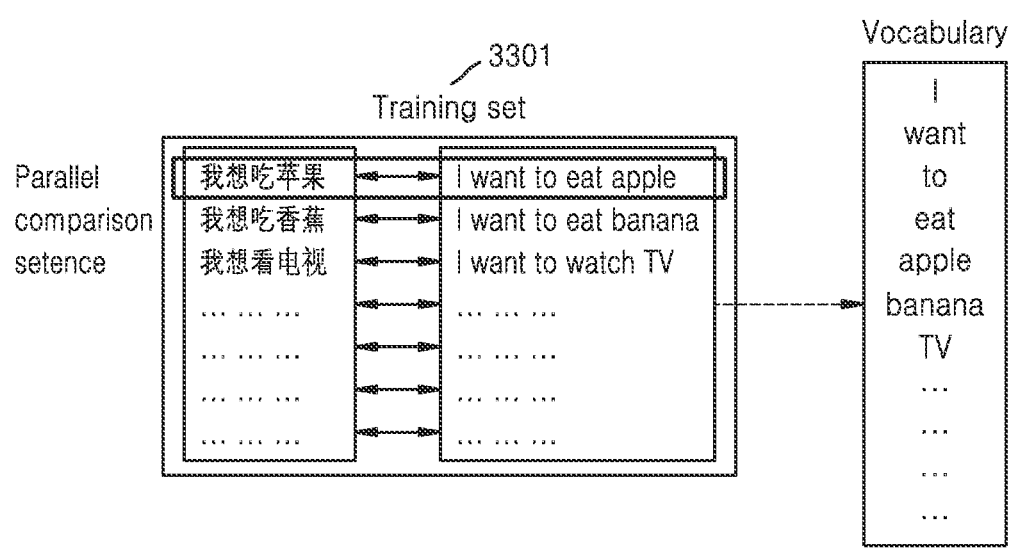
FIG. 33 illustrates a diagram of a training set according to an embodiment.

FIG. 33 illustrates a diagram of a training set according to an embodiment. As shown in FIG. 33, the training set 3301 contains many training sentences, each domain has 500,000 training sentences, so the training set for each domain is 500,000.

For English sentences, all the words that appear in these sentences constitute a vocabulary. There are 30,000 different words in all target sentences, so the vocabulary is 30,000. For example, there are 3 domains and each domain has 500,000 target sentences, so there are a total of 1,500,000 target sentences, and the vocabulary may be extracted from 1,500,000 target sentences.

Figure 34:
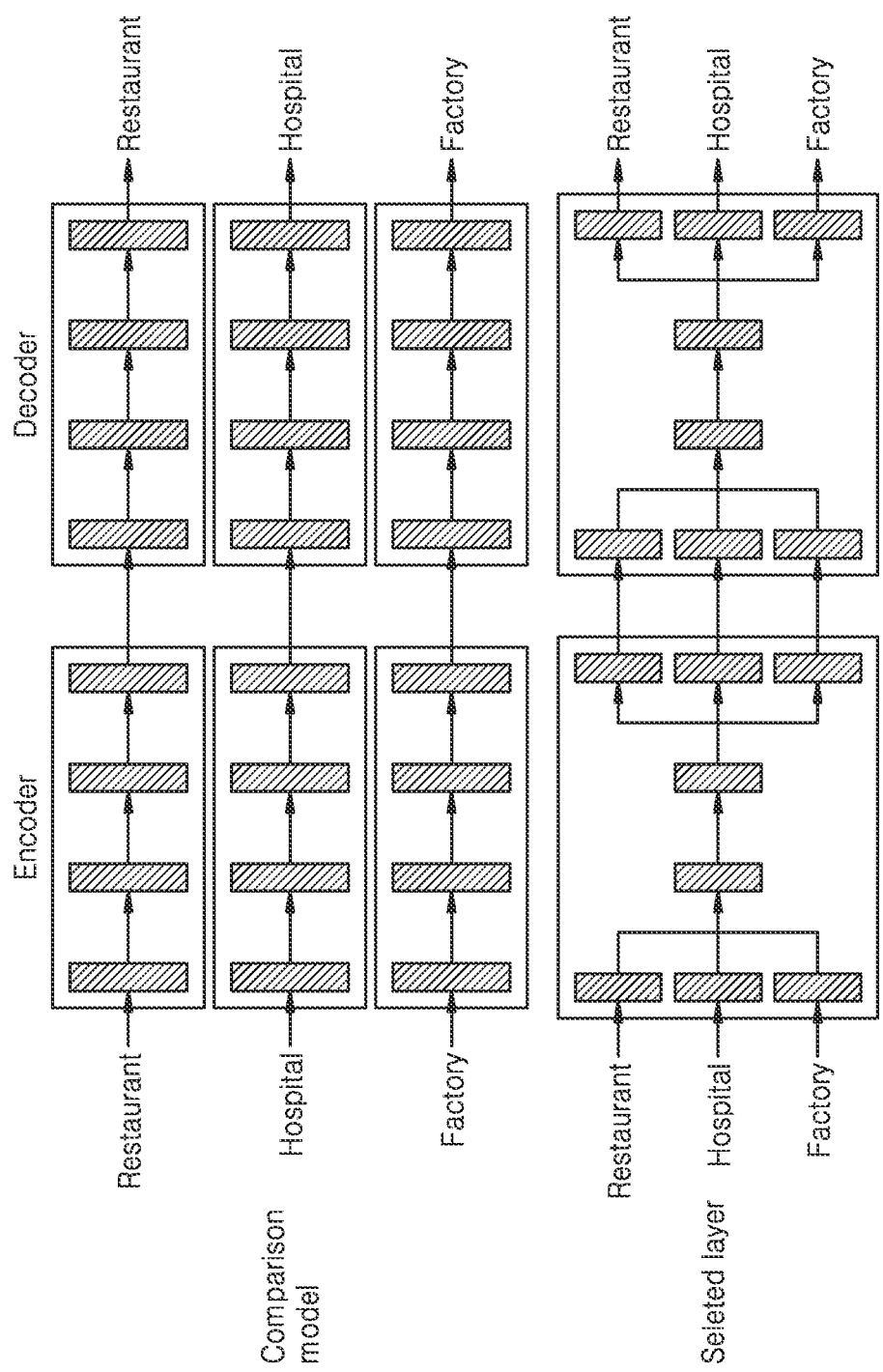
FIG. 34 illustrates a diagram of comparison between model structures according to an embodiment.

FIG. 34 illustrates a diagram of comparison between model structures according to an embodiment. As shown in FIG. 34, for different domains "restaurants", "hospitals" and "factories", different domains in the existing comparison model have independent encoding and decoder layer structures. Each domain needs to set up 8 independent layers, three different domains are provided with 24 layers, and in the encoder/decoder based on the selected layer in the disclosure, there are independent layers and shared layers between different domains, and a total of 16 layers are provided in three different domains.

Figure 35:
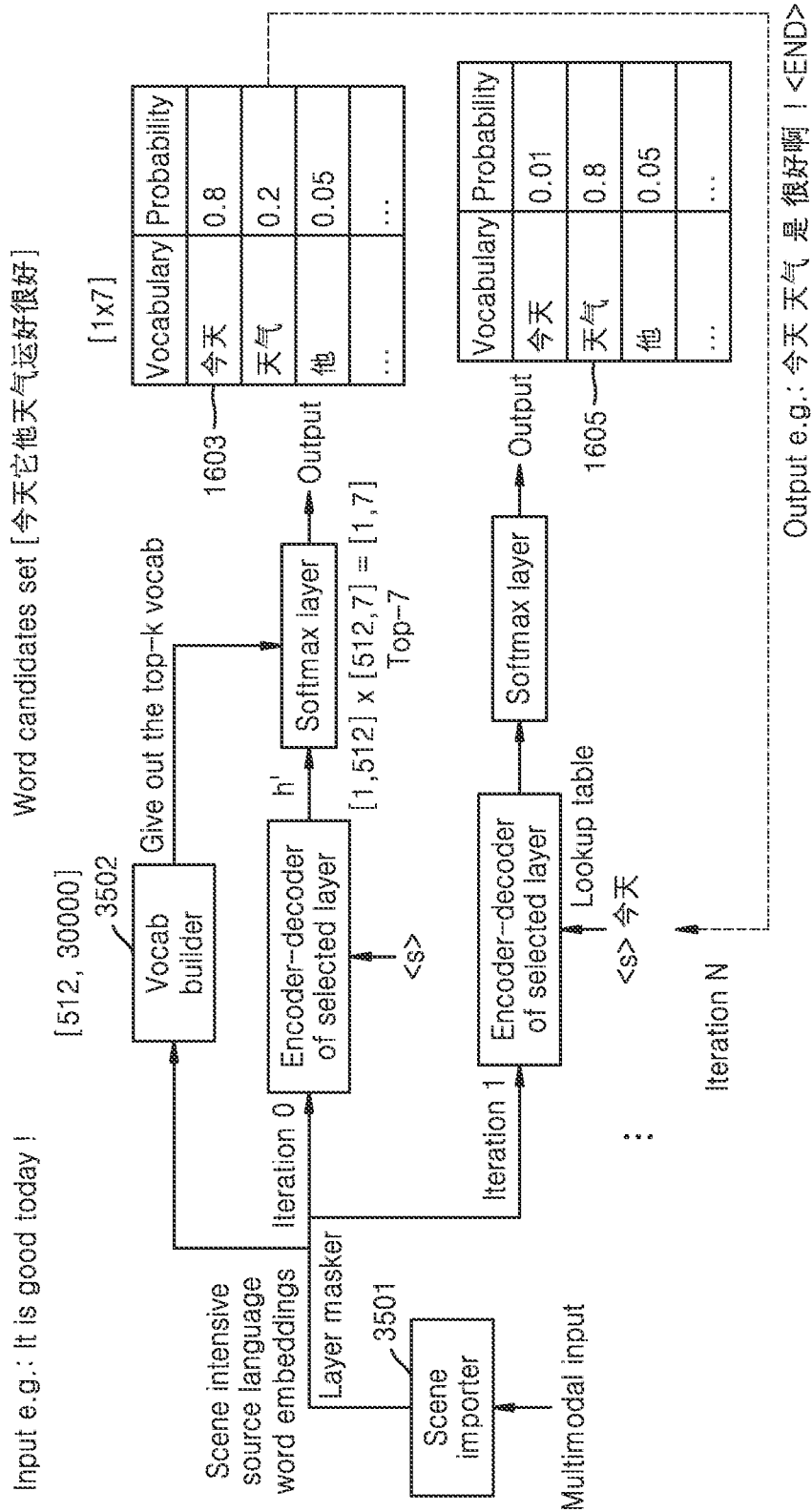
FIG. 35 illustrates a flowchart of a multimodal translation method according to an embodiment.

FIG. 35 illustrates a flowchart of a multimodal translation method according to an embodiment. In an example, the multimodal translation process in the disclosure may include the following operations:

(1) Given a multimodal input, generating scene features and layer maskers through the scene importer 3501 (main complexity: CNN), (2) Scene intensive source language word embedding is input of a vocabulary builder 3502 and top-k vocabulary may be acquired by the vocabulary builder 3502 (such as top-7 vocabulary) (main complexity: [1,512]×[512,30000]), (3) The scene feature and source language word embedding are passed through the encoder of the selection layer to acquire the scene vector, (4) The scene vector is transformed into a matrix h' of size [1×512] through the decoder of the selected layer, (5) h' acquires the target vocabulary probability (also, referred to as target vocabulary probaiblities) through softmax (main complexity: [1,512]×[512,7]=[1,7]), (6) The best target word is selected as the next input of the decoder, (7) Operations 3-6 are repeated until the end mark is generated.

The present disclosure provides attention-based multimodal scene information fusion. Fusing multimodal information the disclosure to give domain (context) information, 1-A: Extracting scene features based on multimodal input (such as location, image, audio, text), 1-B: The scene feature is constructed by the attention network fusion, and the location information has an impact on other features through more location-related parts, and the system generates, using convolutional networks, domain labels based on scene features. Thus, the domain information of the disclosure is more accurate, in consideration of multimodal information.

The present disclosure provides an encoder-decoder of a selected layer. Existing technology establishes different models for different domains. As the number of domains increases, the total scale of the model may be very large. For the use of domain information, only domain labels are input to the encoder. The provides encoder-decoder of the selected layer to reduce the model size. The system determines the layer masker based on the domain label to determine the running layer, some layers may be reused, and the entire model size is reduced. The encoder uses both scene features and source language word embeddings as input to ensure that the encoded features are suitable for the current domain. Thus, the model of the disclosure may be much smaller than the size of existing patents, and may be easier to apply on devices. The disclosure not only uses domain labels in translation, but also uses scene features.

The present disclosure provides a scene-based softmax based on vocabulary builder. Existing methods calculate the probability of each word in the entire vocabulary, and the calculation cost is relatively high. The disclosure provides a scene-based softmax based on a vocabulary builder to reduce calculation costs and speed up inference. The disclosure provides a top-k word selection method based on scene features, the top-k word may be used in the softmax layer. Thus, the model of the disclosure is faster than existing methods and may improve the user experience.

Below, the experimental results and proof for the differences above are explained. A first operation includes, given location-sensitive multimodal input, predicting the range. Assumption: location-sensitive multimodal input may provide better domain predictions than single multimodal input.

Assumption proof: Denoting the multimodal input information as M and the location information as L. The conditional entropy of the domain D on the multimodal input may be written as H(D|M), and the conditional entropy of the domain D on the location-sensitive multimodal input may be written as H(D|M,L), then:

$$(D|M)-(D|M,L)=I(D,M,L) \quad (8)$$

Where, I(D,M,L) is the fusion information of variables D, M and L. According to the non-negative property of the fusion information.

$$I(D,M,L) \geq 0 \quad (9)$$

$$(D|M)>(D|M,L) \quad (10)$$

According to the entropy property of measuring variable uncertainty by entropy, the greater the entropy is, the greater the uncertainty is. It may be inferred that only a given M may predict the uncertainty of D than both M and L being given. Therefore, it may be inferred that location-sensitive multimodal input may perform better domain prediction than multimodal input alone.

A second operation includes, given the domain label and source language, predicting the translated content.

TABLE 3

Comparison Of Translation Effect

| Method | BLEU (hotel) | BLEU (hospital) | BLEU (market) | Size of model | Inference time |
|---|---|---|---|---|---|
| Baseline system (without scene information) | 21.59 | 23.48 | 22.07 | 414.0M | 547.8 ms |
| Disclosure-1 (error scene information, translation network of the disclosure) | 19.59 | 22.17 | 20.95 | 153.6M | 354.8 ms |
| Disclosure-2 (correct scene information, translation network of the disclosure) | 23.43 | 25.68 | 24.25 | 153.6M | 354.8 ms |

As shown in Table 3, the disclosure tests the influence of domain related scene information on the translation effect, while testing the influence of the translation network of the disclosure on the translation effect. The evaluation result uses BLEU to indicate the quality of translation. The higher the BLEU is, the better the translation quality.

The baseline system is a transformer translation system without scene information. During the test, the translation quality and translation latency in different scenarios are tested, respectively. In contrast, during the test, if the error/correct scene information is input, the changes in the translation quality under each scene are observed. Based on Table 1, it may be concluded that the correct scene information may acquire higher translation quality. For the translation quality of hotel, hospital, and market, changing the scene information into correct information may improve 3-4 percentage points. It may be concluded that the translation network of the disclosure may reduce storage and inference time. Theoretically, the more scenes that are processed are, the more the multimodal translation method of the disclosure may save more storage than the original transformer structure.

The above-mentioned multimodal translation method may help the translation model to better judge the current scene by importing scene information into the translation, thereby reducing ambiguity in semantic understanding and improving the accuracy of translation.

Further, when translating the source language text, it may focus on the role of location information, or the reinforcement of objective knowledge to subjective knowledge, so as to more accurately determine the translated content in the target language.

Further, by selecting different layers of the encoder-decoder for decoding according to the domain labels, multiple domain labels share some layer parameters, which reduces consumption of memory.

Further, the layer structure is selected, of the translation model with more accurate translation effects in the corresponding domain, that is, the running layer performs encoding and decoding tasks to acquire the translated content, and other non-running layers may not perform encoding or decoding tasks, which may improve translation accuracy while improving translation efficiency.

Further, by first screening original translation candidate words, some candidate words related to the scene and the source language are selected, with a higher probability of selection, and then a search space may be reduced in a subsequent decoding process, such that search calculation may be effectively reduced and translation efficiency may be improved.

Figure 36:
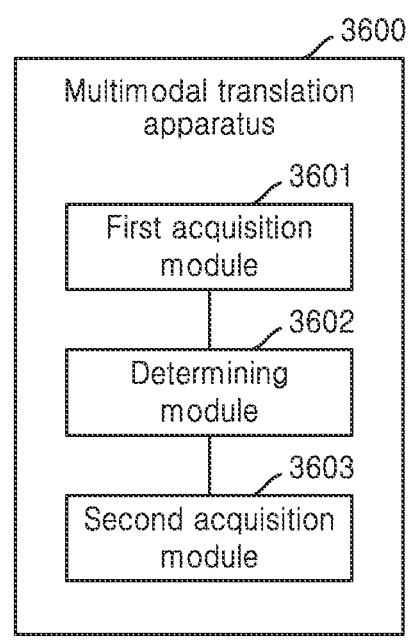
FIG. 36 illustrates a structural diagram of a multimodal translation apparatus according to an embodiment.

The foregoing embodiments introduce the multimodal translation method from the perspective of the method flow. The following describes the method from the perspective of the virtual module, which is specifically as follows:

FIG. 36 illustrates a structural diagram of a multimodal translation apparatus according to an embodiment.

The embodiments of the disclosure provide a multimodal translation apparatus 3600, as shown in FIG. 36, including a first acquisition module 3601, a determining module 3602, and a second acquisition module 3603, where: the first acquisition module 3601 is configured to acquire a multimodal input in a source language, the determining module 3602 is configured to determine scene information according to the multimodal input, and the second acquisition module 3603 is configured to acquire translated content of a target language using a translation model, based on the scene information.

In a possible implementation of the embodiment of the disclosure, the multimodal input includes location information and at least one of the following: text, image, audio, video, and biometric signal.

In a possible implementation of the embodiment of the disclosure, the determining module 3602 is further, when determining scene information according to the multimodal input, configured to: extract the location entity semantic information based on the location information, and extract the source text semantic information and multimodal features based on other multimodal inputs, acquire scene information based on the location entity semantic information, the source text semantic information, and the multimodal feature.

In a possible implementation of the embodiment of the disclosure, the multimodal feature includes at least one of the following: edge information of the image, color information of the image, abstractive information of the image, pitch information, a vocal information, and phonetic information.

In a possible implementation of the embodiment of the disclosure, when acquiring scene information based on the location entity semantic information, the source text semantic information, and the multimodal feature, the determining module 3602 is further configured to fuse the location entity semantic information, the source text semantic information, and the multimodal feature to acquire the fusion result, based on the attention network, and acquire the scene information based on the fusion result.

In a possible implementation of the embodiment of the disclosure, when fusing the location entity semantic information, the source text semantic information, and the multimodal feature to acquire the fusion result, based on the attention network, and acquiring the scene information based on the fusion result, the determining module 3602 is further configured to fuse the source text semantic information with multimodal features to acquire a first fusion feature, determine a weight of the first fusion feature using the attention network, based on the location entity semantic information, weight the first fusion feature according to the weight, and fuse the weighted first fusion feature with the location entity semantic information to acquire the domain related scene information.

In a possible implementation of the embodiment of the disclosure, when fusing the location entity semantic information, the source text semantic information, and the multimodal feature to acquire the fusion result, based on the attention network, and acquiring the scene information based on the fusion result, the determining module 3602 is configured to fuse the location entity semantic information with the multimodal feature to acquire the second fusion feature, determine the weight of the source text semantic information using the attention network, based on the second fusion feature, using the weighted source text semantic information as the domain related scene information.

In a possible implementation of the embodiment of the disclosure, when acquiring translated content in a target language using a translation model, based on the domain related scene information, the second acquisition module 3603 is configured to determine the running layer in the translation model based on the domain related scene information, acquire the translated content using the translation model including the running layer.

In a possible implementation of the embodiment of the disclosure, when determining the running layer in the translation model based on the domain related scene information, the second acquisition module 3603 is configured to: determine the domain label based on the domain related scene information, select a layer masker corresponding to the domain label from the pre-defined layer maskers, and determine the running layer in the translation model based on the selected layer masker.

In a possible implementation of the embodiment of the disclosure, when determining the domain label based on domain related scene information, the second acquisition module 3603 is further configured to: perform feature extraction, using a CNN, on the domain related scene information, and determine, using a context classification network, the domain label based on the output of the CNN.

In a possible implementation of the embodiment of the disclosure, when acquiring translated content in a target language using a translation model, based on the domain related scene information, the second acquisition module 3603 is further configured to: determine the candidate words according to the domain related scene information, and determine the translated content from the candidate words according to the output of the translation model.

In a possible implementation of the embodiment of the disclosure, when determining the candidate words according to the domain related scene information, the second acquisition module 3603 is further configured to: fuse the source text semantic information extracted from the multimodal input with the domain related scene information to acquire a third fusion feature, perform, using the feedforward neural network, feature extraction on the third fusion feature, calculate the selection probability of each word in the target language candidate word set according to the output of the feedforward neural network, determine the candidate words according to the selection probability of each word in the target language candidate word set.

In the above multimodal translation apparatus, importing the domain related scene information into the translation, may contribute to the translation model better judging the current scene, thereby reducing ambiguity in semantic understanding and improving the accuracy of translation.

Further, when translating the source language text, it may focus on the role of location information, or the reinforcement of objective knowledge to subjective knowledge, so as to more accurately determine the translated content in the target language.

Further, by selecting different layers of the encoder-decoder for decoding according to the domain labels, multiple domain labels share some layer parameters, which reduces consumption of memory.

Further, the layer structure is selected, of the translation model with more accurate translation effects in the corresponding domain, that is, the running layer performs encoding and decoding tasks to acquire the translated content, and other non-running layers may not perform encoding or decoding tasks, which may improve translation accuracy while improving translation efficiency.

Further, by first screening original translation candidate words, some candidate words related to the scene and the source language are selected, with a higher probability of selection, and then a search space may be reduced in a subsequent decoding process, such that search calculation may be effectively reduced and translation efficiency may be improved.

The multimodal translation apparatus of image according to the embodiments of the present disclosure may execute the multimodal translation method of image provided by the embodiments of the present disclosure, both of which have a similar implementation principle. The actions performed by each module in the multimodal translation apparatus of image in the embodiments of the present disclosure correspond to the steps in the multimodal translation method of image in each embodiment of the present disclosure. The detailed function description of each module of multimodal translation apparatus of image may be specifically referred to the description in the corresponding multimodal translation method of image shown in preceding, which may not be repeated here.

In the above, the multimodal translation apparatus provided by the embodiment of the disclosure is introduced from the perspective of functional module. Next, the electronic device provided by the embodiment of the disclosure may be introduced from the perspective of hardware materialization, and at the same time, the computing system of the electronic device may be introduced.

Based on the same principle as the method shown in the embodiment of the present disclosure, the embodiments of the disclosure further provide an electronic device, and the electronic device includes but not limiting to: a memory, configured to store computer operation instructions, and a processor, configured to execute the multimodal translation method shown in the embodiment by invoking computer operation instructions. Comparing with existing methods, in the multimodal translation method, importing the domain related scene information into the translation, may contribute to the translation model better judging the current scene, thereby reducing ambiguity in semantic understanding and improving the accuracy of translation.

Figure 37:
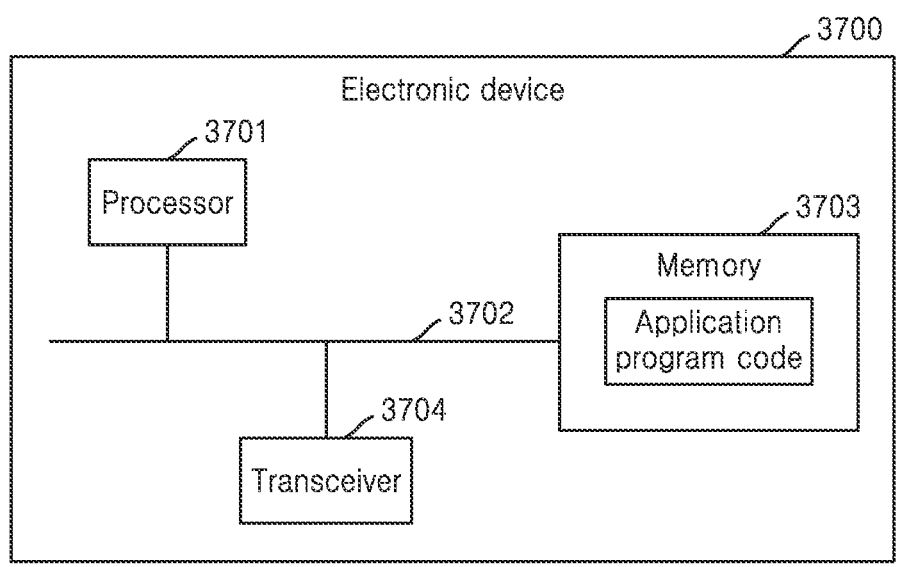
FIG. 37 illustrates a structural diagram of an electronic device according to an embodiment.

FIG. 37 illustrates a structural diagram of an electronic device according to an embodiment.

In one embodiment, an electronic device is provided. As shown in FIG. 37, the electronic device 3700 may include a processor 3701 and a memory 3703. The processor 3701 is connected to the memory 3703, for example, via the bus 3702. Alternatively, the electronic device 3700 may further include a transceiver 3704. It should be noted that in practical disclosures, the number of transceivers 3704 is not limited to one, and the structure of the electronic device 3700 does not limit the embodiments of the present disclosure.

The processor 3701 may be a central processing unit (CPU), a general-purpose processor, a digital signal processor (DSP), an application specific integrated circuit (ASIC), a domain programmable gate array (FPGA), or other programmable logic devices, transistor logic devices, hardware components, or any combination thereof. It is possible to implement or execute the various exemplary logical blocks, modules and circuits described in combination with the disclosures of the present disclosure. The processor 3701 may also be a combination of computing functions, such as a combination of one or more microprocessors, a combination of a DSP and a microprocessor, and so on.

The bus 3702 may include a path for communicating information between the above components. The bus 3702 may be a peripheral component interconnect (PCI) bus or an extended industry standard architecture (EISA) bus. The bus 3702 may be divided into an address bus, a data bus, a control bus, and so on. For the sake of presentation, FIG. 37 multiple bus types.

The memory 3703 may be a read only memory (ROM) or other type of static storage device that may store static information and instructions, random access memory (RAM) or other types of dynamic storage device that may store information and instructions, also may be electrically erasable programmable read only memory (EEPROM), compact disc read only memory (CD-ROM) or other optical disc storage, optical disc storage (including compression optical discs, laser discs, optical discs, digital versatile discs, Blu-ray discs, etc.), magnetic disk storage media or other magnetic storage devices, or any other medium that may be used to carry or store desired program code in the form of instructions or data structures and may be accessed by a computer, but not limited to this.

The memory 3703 is used to store application program code that, when executed by the processor 3701, implements the solution of the present disclosure. The processor 3701 is configured to execute application program code stored in the memory 3703 to implement the content shown in any of the foregoing method embodiments.

The electronic device may include, but is not limited to, a mobile terminal, such as a mobile phone, a notebook computer, a digital broadcast receiver, a personal digital assistant (PDA), a portable android device (PAD), a portable multimedia player (PMP), an in-vehicle terminal (for example, a car navigation terminal) and the like, as well as a fixed terminal such as digital TV, a desktop computer and the like. The electronic device shown in the FIG. 37 is merely an example, and then should not construct any limitation on the function and scope of use of the embodiments of the present disclosure.

Embodiments of the present disclosure provide a non-transitory computer-readable storage medium on which a computer program is stored, and when the computer program is executed on a computer, it enables the computer to execute the corresponding content in the foregoing method embodiments. Compared with existing methods, the method for determining the word representation vector of the present disclosure may effectively acquire a corresponding set of glyph units even for hieroglyphics in which hyperbolic characters are prone to appear or languages evolved from the hieroglyphics, thereby improving an accuracy of determining the word representation vector.

It should be understood although the each of steps in the flowchart of the drawings are sequentially shown as the arrows, these steps are not necessarily performed in the order indicated by the arrows. Unless otherwise expressly stated herein, the implementation of these steps is not strictly limited in the order, and they may be performed in other orders. Moreover, at least some of the steps in the flowchart of the drawings may include a plurality of sub-steps or stages, and the plurality of sub-steps or stages are not necessarily performed at the same time, but may be performed at different times, and the plurality of sub-steps or stages are not necessary to be performed sequentially, but may be performed alternately with at least a portion of other steps or sub-steps or stages of other steps.

It should be noted that the above computer-readable medium of the present disclosure may be a computer-readable signal medium or a computer-readable storage medium or any combination of the above two. The computer-readable storage medium may be, for example, but is not limited to, an electronic, magnetic, optical, electromagnetic, infrared, or semiconductor system, apparatus, or device, or any combination of the above. More specific examples of the computer-readable storage media may include, but are not limited to, electrical connections having one or more wires, portable computer disks, hard disks, RAM, ROM, EPROM or flash memory, optical fiber, portable CD-ROM, optical storage device, magnetic storage device, or any suitable combination of the above. In the present disclosure, a computer-readable storage medium may be any tangible medium that may contain or store programs, which may be used by or in connection with an instruction execution system, apparatus, or device. In the present disclosure, a computer-readable signal medium may include a data signal that is propagated in the baseband or propagated as part of a carrier, carrying computer-readable program codes. Such propagated data signals may take various forms, which includes, but is not limited to, electromagnetic signals, optical signals, or any suitable combination of the above. The computer-readable signal medium may also be any computer-readable medium except for a computer-readable storage medium, and the computer-readable signal medium may transmit, propagate or transport a program for use by or in connection with an instruction execution system, apparatus or device. Program codes contained on the computer-readable medium may be transmitted by any suitable medium, which includes but is not limited to, wire, fiber optic cable, radio frequency (RF), and the like, or any suitable combination of the above.

The above computer-readable medium may be contained in the above electronic device, or may be separately present and is not incorporated in the electronic device.

The computer-readable medium carries one or more programs, when the one or more programs are executed by the electronic device, causing the electronic device to execute the method shown in the foregoing embodiments.

The computer program codes for executing the operations of the present disclosure may be written in one or more programming languages, or combinations thereof, where the programming languages includes an object-oriented programming language such as Java, Smalltalk, C++, and also includes conventional procedural programming language—such as "C" language or similar programming languages. The program codes may be executed entirely on the user's computer, partly executed on the user's computer, executed as an independent software package, partly executed on the user's computer and partly executed on the remote computer, or entirely executed on the remote computer or on the server. In the case of involving the remote computer, the remote computer may be connected to the user's computer through any kind of network, including a local area network (LAN) or a wide area network (WAN), or may be connected to an external computer (e.g., using an Internet service provider to connect via Internet).

The flowchart and block diagrams in the drawings illustrate the architecture, function, and operation of possible implementations of systems, methods, and computer program products according to various embodiments of the present disclosure. In this regard, each block of the flowchart or block diagram may represent one module, a program segment, or a portion of the codes, and the module, the program segment, or the portion of codes includes one or more executable instructions for implementing the specified logic functions. It should also be noted that in some alternative implementations, the functions noted in the blocks may also occur in an order different from the order noted in the drawings. For example, two successively represented blocks may in fact be executed substantially in parallel, and they may sometimes be executed in the opposite order, depending upon the involved function. It is also noted that each block of the block diagrams and/or flowcharts, and combinations of blocks in the block diagrams and/or flowcharts, may be implemented in a dedicated hardware-based system that executes the specified functions or operations, or it may be implemented by a combination of dedicated hardware and computer instructions.

The modules described in the embodiments of the present disclosure may be implemented in software or hardware. In some cases, the name of the module does not constitute a limitation on the module itself. For example, the prediction module may also be described as "a module for predicting the next word".

The above description is only a preferred embodiment of the present disclosure and a description of the principles of the applied technology. It should be understood by those skilled in the art that the disclosure scope of the present disclosure is not limited to the specific technical solutions of the above technical features, and should also cover other technical solutions formed by the random combination of the above technical features or equivalent features thereof without departing from the above disclosed concept, such as a technique solution in which the above features are replaced with technical features having similar functions disclosed (but is not limited) in the present disclosure.

The invention claimed is:

1. A method for providing multimodal translation of a content in a source language, the method comprising:
  receiving a user input with respect to a translation request of text included in the content;
  in response to receiving the user input, acquiring a multimodal input from the content, the multimodal input including location information related to the content and other multimodal inputs, the location information corresponding to a geographical location from where the content is derived;
  generating scene information representing the multimodal input related to the content by using a fusion layer configured to fuse location entity semantic information extracted based on the location information, and source text semantic information and a multimodal feature extracted based on the other multimodal inputs, into a fusion result such that the scene information is generated based on the fusion result;
  identifying a candidate word set in a target language;
  determining at least one candidate word from the candidate word set based on the scene information; and
  translating the text included in the content into the target language using a translation model based on the determined at least one candidate word.

2. The method of claim 1, wherein the generating the scene information representing the multimodal input related to the content comprises:
  extracting the location entity semantic information based on the location information,
  extracting the source text semantic information and the multimodal feature based on the other multimodal inputs; and
  acquiring the scene information based on an attention network by fusing the location entity semantic information, the source text semantic information, and the multimodal feature.

3. The method of claim 2, wherein the location entity semantic information comprises a feature vector associated with the location information, wherein the source text semantic information comprises a word embedding of the source language extracted from the other multimodal inputs, and wherein the multimodal feature comprises at least one of an image feature vector, an audio feature vector, a video feature vector or a biometric signal vector.

4. The method of claim 2, wherein the acquiring the scene information comprises:

acquiring a first fusion feature by fusing the source text semantic information with the multimodal feature;

determining a weight of the first fusion feature using the attention network based on the location entity semantic information;

weighting the first fusion feature based on the weight; and acquiring the scene information by fusing the weighted first fusion feature with the location entity semantic information.

5. The method of claim 2, wherein the acquiring the scene information comprises:

acquiring a second fusion feature by fusing the location entity semantic information with the multimodal feature;

determining a weight of the source text semantic information using the attention network based on the second fusion feature;

weighting the source text semantic information based on the weight; and using the weighted source text semantic information as the scene information.

6. The method of claim 1, further comprising:

determining a domain label related to the location information based on the scene information;

selecting a layer masker corresponding to the domain label based on a domain label distribution; and determining at least one running layer in the translation model corresponding to the layer masker.

7. The method of claim 6, wherein the at least one running layer comprises at least one independent layer corresponding to the layer masker and at least one shared layer.

8. The method of claim 6, wherein the determining the domain label comprises:

performing feature extraction on the scene information using a convolutional neural network (CNN); and determining the domain label using a context classification network based on an output of the CNN.

9. The method of claim 1, wherein the determining the at least one candidate word comprises:

calculating selection probabilities of a plurality of words in the candidate word set based on the scene information; and determining the at least one candidate word based on the selection probabilities of the plurality of words in the candidate word set.

10. The method of claim 9, wherein the translating the text included in the content into the target language further comprises:

calculating target vocabulary probabilities of the at least one candidate word based on a softmax layer; and translating the text included in the content into the target language using the translation model based on the target vocabulary probabilities of the at least one candidate word.

11. The method of claim 1, wherein the other multimodal inputs comprises at least one of a image, an audio, a video, or a biometric signal.

12. An electronic device for multimodal translation of a content in a source language, comprising:

at least one processor; and a memory configured to store instructions that, when executed, cause the at least one processor to:

receive a user input with respect to a translation request of text included in the content;

in response to receiving the user input, acquire a multimodal input from the content, the multimodal input including location information related to the content and other multimodal inputs, the location information corresponding to a geographical location from where the content is derived;

generate scene information representing the multimodal input related to the content by using a fusion layer configured to fuse location entity semantic information extracted based on the location information, and source text semantic information and a multimodal feature extracted based on the other multimodal inputs, into a fusion result such that the scene information is generated based on the fusion result;

identify a candidate word set in a target language;

determine at least one candidate word from the candidate word set based on the scene information; and translate the text included in the content into the target language using a translation model based on the determined at least one candidate word.

13. The electronic device of claim 12, wherein the instructions, when executed, further cause the at least one processor to generate the scene information representing the multimodal input related to the content by:

extracting the location entity semantic information based on the location information, extracting the source text semantic information and the multimodal feature based on the other multimodal inputs; and acquiring the scene information based on an attention network by fusing the location entity semantic information, the source text semantic information, and the multimodal feature.

14. The electronic device of claim 13, wherein the location entity semantic information comprises a feature vector associated with the location information, wherein the source text semantic information comprises a word embedding of the source language extracted from the other multimodal inputs, and wherein the multimodal feature comprises at least one of an image feature vector, an audio feature vector, a video feature vector or a biometric signal vector.

15. The electronic device of claim 12, wherein the instructions, when executed, further cause the at least one processor to:

determine a domain label related to the location information based on the scene information;

select a layer masker corresponding to the domain label based on a domain label distribution; and determine at least one running layer in the translation model corresponding to the layer masker.

16. The electronic device of claim 15, wherein the at least one running layer comprises at least one independent layer corresponding to the layer masker and at least one shared layer.

17. The electronic device of claim 15, wherein the instructions, when executed, cause the at least one processor to determine the domain label by:

performing feature extraction on the scene information using a convolutional neural network (CNN); and determining the domain label using a context classification network based on an output of the CNN.

18. The electronic device of claim 12, wherein the instructions, when executed, further cause the at least one processor to:
- calculate selection probabilities of a plurality of words in the candidate word set based on the scene information; and
- determine the at least one candidate word based on the selection probabilities of the plurality of words in the candidate word set.

19. The electronic device of claim 18, wherein the instructions, when executed, cause the at least one processor to translate the text included in the content into the target language by:
- calculating target vocabulary probabilities of the at least one candidate word based on a softmax layer; and
- translating the text included in the content into the target language using the translation model based on the target vocabulary probabilities of the at least one candidate word.

20. A non-transitory computer-readable storage medium storing instructions that, when executed by a processor, cause the processor to:
- receive a user input with respect to a translation request of text included in a content in a source language;
- in response to receiving the user input, acquire a multimodal input from the content, the multimodal input including location information related to the content and other multimodal inputs, the location information corresponding to a geographical location from where the content is derived;
- generate scene information representing the multimodal input related to the content by using a fusion layer configured to fuse location entity semantic information extracted based on the location information, and source text semantic information and a multimodal feature extracted based on the other multimodal inputs, into a fusion result such that the scene information is generated based on the fusion result;
- identify a candidate word set in a target language;
- determine at least one candidate word from the candidate word set based on the scene information; and
- translate the text included in the content into the target language using a translation model based on the determined at least one candidate word.

* * * * *